(12) United States Patent
Yamakawa et al.

(10) Patent No.: US 9,746,216 B2
(45) Date of Patent: Aug. 29, 2017

(54) HEAT PUMP DEVICE, HEAT PUMP SYSTEM, AIR CONDITIONER, AND FREEZER

(75) Inventors: Takashi Yamakawa, Tokyo (JP); Kazunori Hatakeyama, Tokyo (JP); Shota Kamiya, Tokyo (JP); Shinya Matsushita, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 214 days.

(21) Appl. No.: 14/410,607

(22) PCT Filed: Jun. 29, 2012

(86) PCT No.: PCT/JP2012/066681
§ 371 (c)(1),
(2), (4) Date: Jan. 20, 2015

(87) PCT Pub. No.: WO2014/002251
PCT Pub. Date: Jan. 3, 2014

(65) Prior Publication Data
US 2015/0168033 A1    Jun. 18, 2015

(51) Int. Cl.
*F25B 30/02* (2006.01)
*H02P 27/02* (2016.01)
(Continued)

(52) U.S. Cl.
CPC .............. *F25B 30/02* (2013.01); *F25B 13/00* (2013.01); *F25B 49/025* (2013.01); *H02P 27/02* (2013.01);
(Continued)

(58) Field of Classification Search
CPC .......... H02P 25/24; H02P 31/00; F04B 35/04; H02M 7/53875; F04C 29/045;
(Continued)

(56) References Cited

U.S. PATENT DOCUMENTS 9,543,887 B2 * 1/2017 Hatakeyama ........... F04B 35/04
2003/0098298 A1 * 5/2003 Dohmae ................ F24F 11/008
219/209

(Continued)

FOREIGN PATENT DOCUMENTS

JP    A-55-146368    11/1980
JP    U-60-68341    5/1985

(Continued)

OTHER PUBLICATIONS

Office Action mailed Jun. 2, 2015 issued in corresponding JP patent application No. 2014-522323 (and English translation).

(Continued)

*Primary Examiner* — Christopher R Zerphey
(74) *Attorney, Agent, or Firm* — Posz Law Group, PLC

(57) ABSTRACT

A heat pump device includes: a compressor that compresses a refrigerant; a motor that drives the compressor; a wiring switching unit that switches a wiring structure of the motor; an inverter that applies a desired voltage to the motor; and an inverter control unit that generates a PWM signal for driving the inverter, that includes, as an operation mode, a heating operation mode in which a heating operation is performed on the compressor and a normal operation mode in which a refrigerant is compressed by performing a normal operation on the compressor, and that controls a switching operation of the wiring switching unit in accordance with an operation mode.

16 Claims, 19 Drawing Sheets

(51) Int. Cl.
*F25B 13/00* (2006.01)
*F25B 49/02* (2006.01)
*F25B 1/10* (2006.01)

(52) U.S. Cl.
CPC ......... *F25B 1/10* (2013.01); *F25B 2341/0662* (2013.01); *F25B 2400/01* (2013.01); *F25B 2400/051* (2013.01); *F25B 2400/054* (2013.01); *F25B 2400/13* (2013.01); *F25B 2500/31* (2013.01); *F25B 2600/021* (2013.01); *F25B 2700/2106* (2013.01); *F25B 2700/21156* (2013.01); *Y02B 30/741* (2013.01)

(58) Field of Classification Search
CPC F04C 2270/701; F25B 31/02; F25B 2500/31; F25B 2600/021; F25B 2700/21156
See application file for complete search history.

(56) References Cited

U.S. PATENT DOCUMENTS

| | | | |
|---|---|---|---|
| 2003/0222609 A1* | 12/2003 | Tolbert, Jr. | H02P 1/28 318/296 |
| 2012/0111043 A1* | 5/2012 | Hatakeyama | F04C 29/0085 62/190 |
| 2013/0180273 A1* | 7/2013 | Hatakeyama | F04B 35/04 62/115 |

FOREIGN PATENT DOCUMENTS

| | | |
|---|---|---|
| JP | A-61-091445 | 5/1986 |
| JP | A-08-226714 | 9/1996 |
| JP | A-11-159467 | 6/1999 |
| JP | A-2005-326054 | 11/2005 |
| JP | A-2007-166766 | 6/2007 |
| JP | A-2008-228513 | 9/2008 |
| JP | A-2011-038689 | 2/2011 |
| JP | 2011-250692 A | 12/2011 |
| WO | WO 2012/049763 | 4/2012 |

OTHER PUBLICATIONS

Extended European Search Report issued Jun. 3, 2016 in the corresponding EP application No. 12880255.0.
International Search Report mailed on Sep. 4, 2014 for the corresponding International patent application No. PCT/JP2012/066681 (and English translation).
U.S. Appl. No. 13/818,132, filed Feb. 21, 2013.
U.S. Appl. No. 13/876,450, filed Mar. 27, 2013.
U.S. Appl. No. 13/996,095, filed Jun. 20, 2013.
Office Action issued Dec. 3, 2015 in the corresponding CN application No. 2012800742871 (with partial English translation).
Office Action dated Dec. 7, 2016 issued in corresponding CN patent application No. 201280074287.1 (and English translation).

* cited by examiner

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | −U | 0 | 1 | 1 | 1 | 0 | 0 |
| V4 | +U | 1 | 0 | 0 | 0 | 1 | 1 |
| V5 | −V | 1 | 0 | 1 | 0 | 1 | 0 |
| V6 | −W | 1 | 1 | 0 | 0 | 0 | 1 |
| V7 | 0 | 1 | 1 | 1 | 0 | 0 | 0 |

HEAT PUMP DEVICE, HEAT PUMP SYSTEM, AIR CONDITIONER, AND FREEZER

CROSS REFERENCE TO RELATED APPLICATION

This application is a U.S. national stage application of International Patent Application No. PCT/JP2012/066681 filed on Jun. 29, 2012.

TECHNICAL FIELD

The present invention relates to a heat pump device that includes a compressor, a heat pump system, an air conditioner, and a freezer.

BACKGROUND

Devices exist that supply a high-frequency low voltage to a compressor during shutdown during heating (for example, see Patent Literature 1).

Moreover, devices exist that supply a single-phase AC voltage having a higher frequency than that when a normal operation is performed to a compressor when it is detected that the temperature of the air conditioner's surroundings becomes low (for example, see Patent Literature 2).

Furthermore, devices exist that perform preheating by using copper loss of the wirings of the motor by performing the locked energization in which a DC current is caused to flow (for example, see Patent Literature 3).

Moreover, devices exist that enable heating at a constant electric power and with low noise without depending on the value of the voltage to be applied by driving the inverter with driving signals synchronized with a reference signal (for example, see Patent Literature 4).

PATENT LITERATURE

Patent Literature 1: Japanese Unexamined Utility Model Registration Application Publication No. S60-68341
Patent Literature 2: Japanese Patent Application Laid-Open No. S61-91445
Patent Literature 3: Japanese Patent Application Laid-Open No. 2007-166766
Patent Literature 4: Japanese Patent Application Laid-Open No. 2011-38689

There is however no detailed description in the technology in Patent Literature 1 of a high-frequency low voltage. Therefore, the problem with applying a high frequency is difficult to solve, i.e., it is difficult to keep the amount of heat of the compressor constant regardless of the effects of the manufacturing variations and environmental variations.

Moreover, there is a description in Patent Literature 2 of the application of a voltage from a high-frequency (e.g., 25 kilohertz) single-phase AC power supply and the effects due to the increase in frequency, such as noise reduction due to being outside the audible range, vibration suppression due to being outside the resonance frequency, input reduction and prevention of temperature increase due to the reduction in current by the amount of inductance in the winding, and rotation suppression of the rotating part of the compressor.

However, in the technology described in Patent Literature 2, because a high-frequency single-phase AC power supply is used, a fully-off period, during which all the switching elements are off, is generated for a relatively long period of time, as illustrated in FIG. 3 in Patent Literature 2. At this point, a high-frequency current is regenerated to the DC power supply without it flowing back to the motor via the freewheeling diodes and the current decays quickly during the off-period; therefore, there is a problem in that a high-frequency current does not efficiently flow to the motor and thus the heating efficiency of the compressor degrades. Moreover, the problem with applying a high frequency is difficult to solve, i.e., it is difficult to keep the amount of heat of the compressor constant regardless of the effects of the manufacturing variations and environmental variations. Moreover, when a small motor having low iron loss is used, the amount of heat generation becomes small with respect to the applied voltage; therefore, there is a problem in that the necessary amount of heat cannot be obtained with a voltage that is within a usable range.

Moreover, Patent Literature 3 discloses a technology that enables preheating with the motor being fixed so that it does not rotate by performing locked energization in which a DC current is caused to flow in the motor windings as illustrated in FIG. 4 in Patent Literature 3.

However, the winding resistance of motors tends to decrease because of the highly efficient design of recent motors. Therefore, in the case of the preheating method where a DC current is caused to flow in the motor windings as described in Patent Literature 3, because the amount of heat generation is given by the product of the winding resistance and the square of the current, the current is increased by the amount of the reduction of the winding resistance. Consequently, a problem arises with the heat generation due to the increase of the inverter loss and thus problems arise such as a decrease in reliability and an increase in the cost of heat dissipation structures.

With the technology in Patent Literature 4, when the impedance of the motor is high, the flowing current decreases with respect to the output voltage; therefore, sufficient electric power cannot be input. Moreover, when the impedance is low, the flowing current increases with respect to the output voltage. Therefore, electric power can be obtained with a low voltage; however, the voltage output accuracy deteriorates and there are problems such as DC voltage superposition due to the imbalance between positive and negative output voltages and deterioration of the inverter loss due to the flowing of a narrow-pulse current caused by the reduction of the PWM (Pulse Width Modulation) width of the inverter due to the reduction of the output voltage.

SUMMARY

The present invention has been achieved in view of the above and an object of the present invention is to obtain a heat pump device, a heat pump system, an air conditioner, and a freezer capable of efficiently heating a refrigerant stagnated in a compressor while suppressing noise.

In order to solve the above problems and achieve the object, the present invention relates to a heat pump device including: a compressor that compresses a refrigerant; a motor that drives the compressor; a wiring switching unit that switches a wiring structure of the motor; an inverter that applies a desired voltage to the motor; and an inverter control unit that generates a PWM signal for driving the inverter, that includes, as an operation mode, a heating operation mode in which a heating operation is performed on the compressor and a normal operation mode in which a refrigerant is compressed by performing a normal operation on the compressor, and that controls a switching operation of the wiring switching unit in accordance with an operation mode.

The heat pump device according to the present invention obtains an effect in that it is possible to generate a high-frequency voltage with high waveform output accuracy and a refrigerant stagnated in the compressor can be efficiently heated while suppressing noise.

Moreover, the heat pump device according to the present invention obtains an effect in that a constant electric power can be always input to the motor without depending on the value of the voltage to be applied to the inverter and it is possible to prevent the compressor from being damaged because of insufficient heating.

BRIEF DESCRIPTION OF DRAWINGS

FIG. 4-1 is a diagram illustrating a configuration example of a wiring switching unit.

FIG. 4-2 is a diagram for explaining the operation of the wiring switching unit.

FIG. 4-3 is a diagram for explaining the operation of the wiring switching unit.

FIG. 23-1 is a conceptual diagram illustrating an effect of a calculation error with respect to the line voltage.

FIG. 23-2 is a conceptual diagram illustrating an effect of a calculation error with respect to the line voltage.

DETAILED DESCRIPTION

Exemplary embodiments of a heat pump device, a heat pump system, an air conditioner, and a freezer according to the present invention will be explained in detail below with reference to the drawings. The present invention is not limited to the embodiments.

First Embodiment

Figure 1:
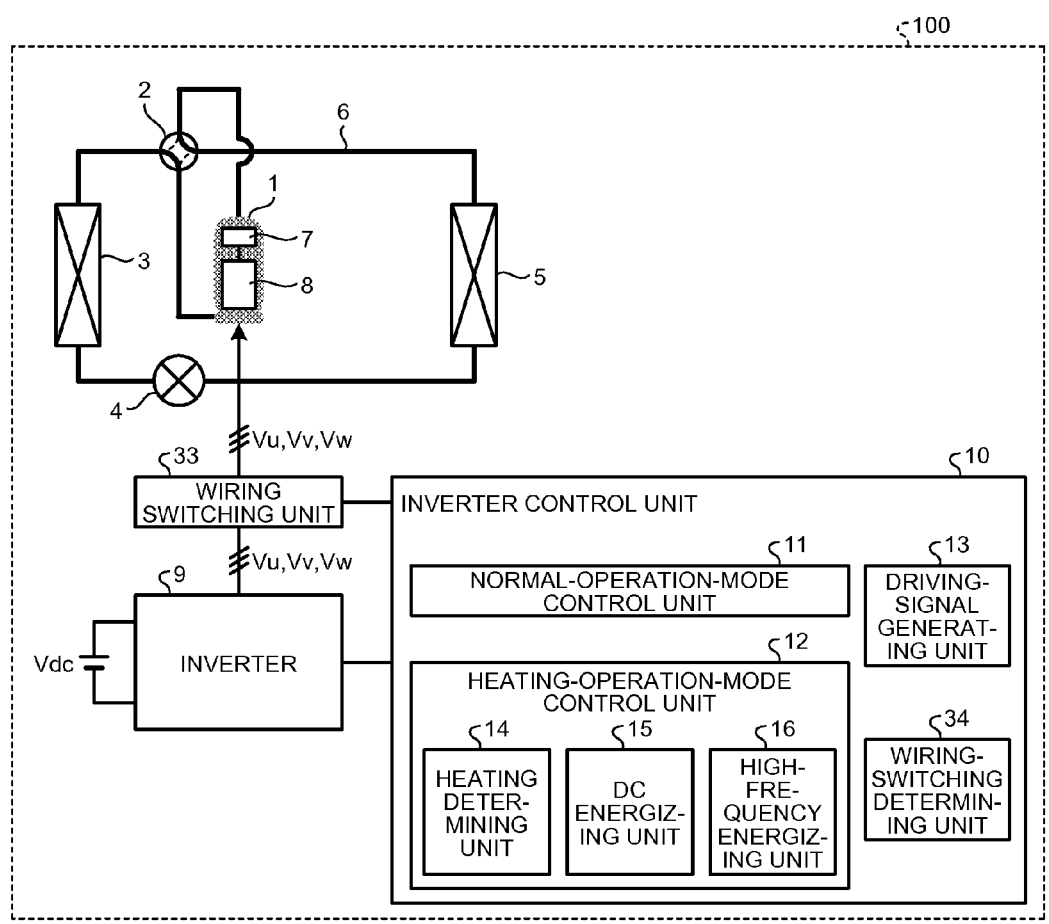
FIG. 1 is a diagram illustrating a configuration example of a heat pump device in a first embodiment.

FIG. 1 is a diagram illustrating a configuration example of a first embodiment of a heat pump device according to the present invention. As illustrated in FIG. 1, a heat pump device 100 according to the present embodiment includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7, which compresses a refrigerant, and a motor 8, which actuates the compression mechanism 7, are provided in the compressor 1. The motor 8 is a three-phase motor including windings for three phases, i.e., U-phase, V-phase, and W-phase.

An inverter 9, which applies a voltage to the motor 8 to drive the motor 8, is electrically connected to the motor 8 via a wiring switching unit 33. The inverter 9 uses a DC voltage (bus voltage) Vdc as a power supply and applies voltages Vu, Vv, and Vw to the U-phase, V-phase, and W-phase windings of the motor 8, respectively.

The inverter 9 is electrically connected to an inverter control unit 10. The inverter control unit 10 includes a normal-operation-mode control unit 11 and a heating-operation-mode control unit 12 that respectively correspond to two operation modes, i.e., a normal operation mode and a heating operation mode. The inverter control unit 10 outputs signals for driving the inverter 9, for example, PWM signals, to the inverter 9 and outputs signals for switching the wiring switching unit 33.

The normal-operation-mode control unit 11 outputs PWM signals for rotationally driving the motor 8. The heating-operation-mode control unit 12 includes a heating determining unit 14, a DC energizing unit 15, and a high-frequency energizing unit 16; therefore, unlike the normal operation mode, the heating-operation-mode control unit 12 causes a DC current or a high-frequency current that the motor 8 cannot follow to flow to the motor 8 to heat the motor without rotationally driving the motor 8, thereby warming and vaporizing the liquid refrigerant stagnated in the compressor 1 and discharging the refrigerant.

Figure 2:
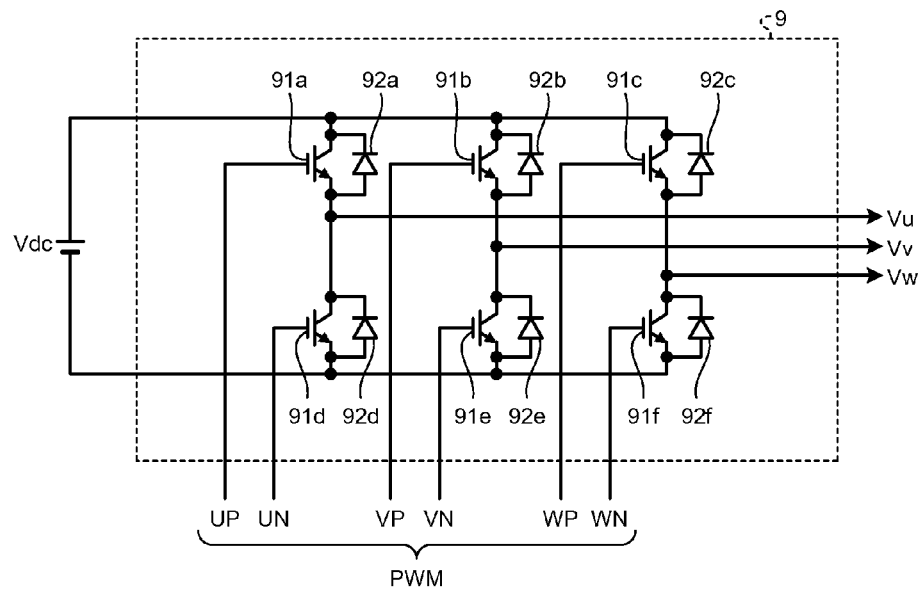
FIG. 2 is a diagram illustrating a configuration of an inverter in the first embodiment.

FIG. 2 is a diagram illustrating the configuration of the inverter 9 in the present embodiment. The inverter 9 uses the bus voltage Vdc as a power supply. The inverter 9 is a circuit in which three series connecting units are connected in parallel and reflux diodes 92a to 92f are provided. Each of the series connecting units is configured from two switching elements (91*a* and 91*d*, 91*b* and 91*e*, or 91*c* and 91*f*) and the reflux diodes 92*a* to 92*f* are connected in parallel with the respective switching elements 91*a* to 91*f*. In accordance with PWM signals UP, VP, WP, UN, VN and WN transmitted from the inverter control unit 10, the inverter 9 drives the respective switching elements (91*a* is driven by UP, 91*b* is driven by VP, 91*c* is driven by WP, 91*d* is driven by UN, 91*e* is driven by VN, and 91*f* is driven by WN) to generate three-phase voltages Vu, Vv, and Vw and then applies these voltages to the U-phase, V-phase, and W-phase windings of the motor 8 via the wiring switching unit 33, respectively.

Figure 3:
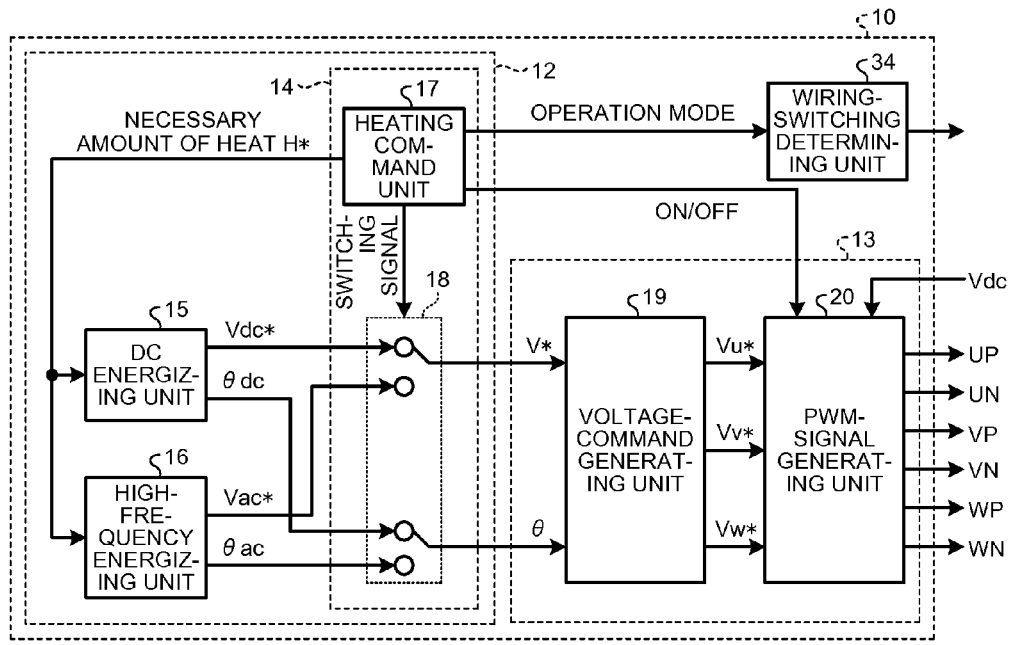
FIG. 3 is a diagram illustrating a configuration example of an inverter control unit in the first embodiment.

FIG. 3 is a diagram illustrating a configuration example of the inverter control unit 10 in the present embodiment. The inverter control unit 10 includes the heating-operation-mode control unit 12, a driving-signal generating unit 13, and a wiring-switching determining unit 34. The wiring-switching determining unit 34 outputs a signal for operating the wiring switching unit 33 on the basis of the operation mode information (information indicating whether the mode is the normal operation mode or the heating operation mode).

The heating-operation-mode control unit 12 includes the heating determining unit 14, the DC energizing unit 15, and the high-frequency energizing unit 16. The heating determining unit 14 includes a heating command unit 17 and an energization switching unit 18. The heating command unit 17 obtains a necessary amount of heat H* necessary for removing the stagnated refrigerant. The DC energizing unit 15 generates a DC voltage command Vdc* and a DC phase command θdc on the basis of H*. The high-frequency energizing unit 16 generates a high-frequency voltage command Vac* and a high-frequency phase command θac for generating a high-frequency AC voltage. The heating command unit 17 transmits a switching signal to the energization switching unit 18 so as to control which of Vdc* and θdc and Vac* and θac are to be selected and transmitted as a voltage command V* and a phase command θ to the driving-signal generating unit 13.

The driving-signal generating unit 13 includes a voltage-command generating unit 19 and a PWM-signal generating unit 20. The voltage-command generating unit 19 generates three-phase (U-phase, V-phase, and W-phase) voltage commands Vu*, Vv*, and Vw* on the basis of the voltage command V* and the phase command θ. The PWM-signal generating unit 20 generates the PWM signals (UP, VP, WP, UN, VN, and WN) for driving the inverter 9 on the basis of the three-phase voltage commands Vu*, Vv*, and Vw* and the bus voltage Vdc, thereby applying a voltage to the motor 8 and heating the compressor 1.

Figures 1, 4:
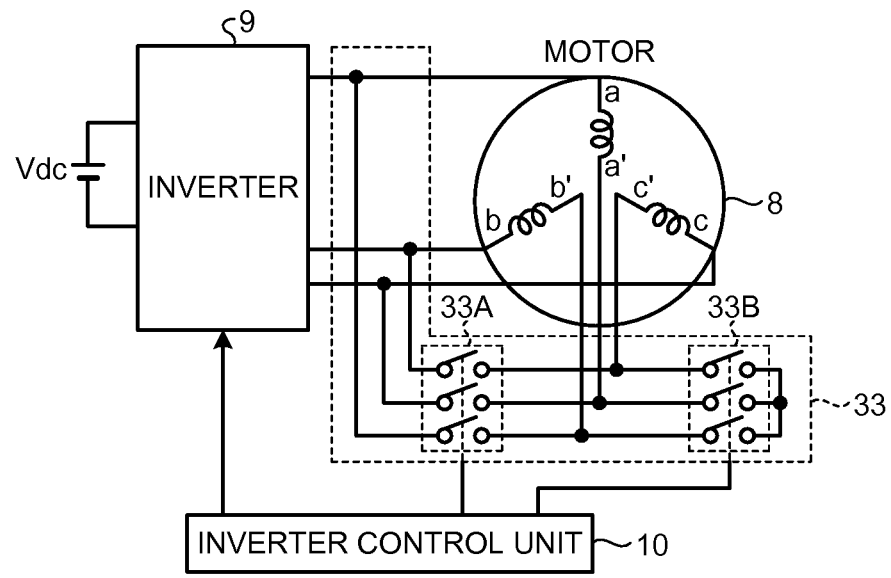
Figures 2, 4:
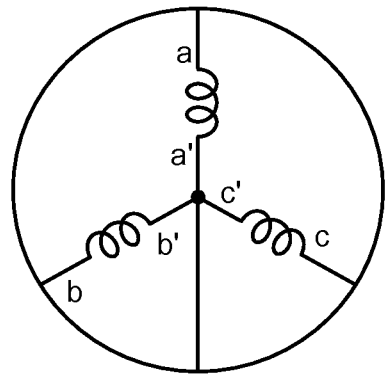
Figures 3, 4:
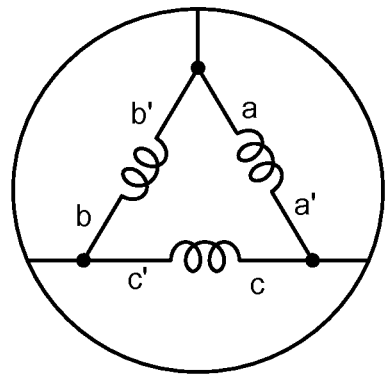

The detailed operation will be explained below. FIG. 4-1 to FIG. 4-3 are diagrams for explaining the operation of the wiring switching unit 33. First, the operation of the wiring switching unit 33 by the wiring-switching determining unit 34 is explained with reference to FIG. 4-1, which illustrates a configuration example. Assuming that both ends of the U-phase wiring are a-a', both ends of the V-phase wiring are b-b', and both ends of the W-phase wiring are c-c', when a contact 33B is on (closed) and a contact 33A is off (open), one ends a', b', and c' of the respective phase wirings are connected to form a Y-connection as illustrated in FIG. 4-2. In contrast, when the contact 33B is off and the contact 33A is on, a and b', b and c', and c and a' are respectively connected and a Δ-connection can be formed as illustrated in FIG. 4-3. Therefore, the phase impedance of the motor wirings viewed from the inverter can be made equivalent to $1/\sqrt{3}$ times with reference to a Y-connection by switching the connection of the motor wirings.

While the operation frequency in the normal operation mode is a few hundred hertz at most, the operation frequency in the heating operation mode is a few kilohertz or higher; therefore, the wiring impedance of the motor 8 in the heating operation mode becomes larger than that in the normal operation mode. Therefore, a current flows with difficulty with respect to the output voltage of the inverter 9. Generally, motors are designed to be optimized during a normal operation in which the consumption power is large and thus are not designed to be optimized during a heating operation in most cases. Consequently, the compressor is in some cases difficult to heat because of the reduction in current. Therefore, in the case of the heating operation mode, the wiring switching unit 33 switches the connection such that the impedance of the motor 8 is optimized. Accordingly, a wiring impedance can be obtained that is optimized for the heating operation mode and thus the amount of heat can be increased. Moreover, because the impedance is reduced also during DC energization, the electric power that can be supplied can be increased and thus the amount of heat can be increased. The configuration of the wiring switching unit 33 is not limited to the above example.

Figure 5:
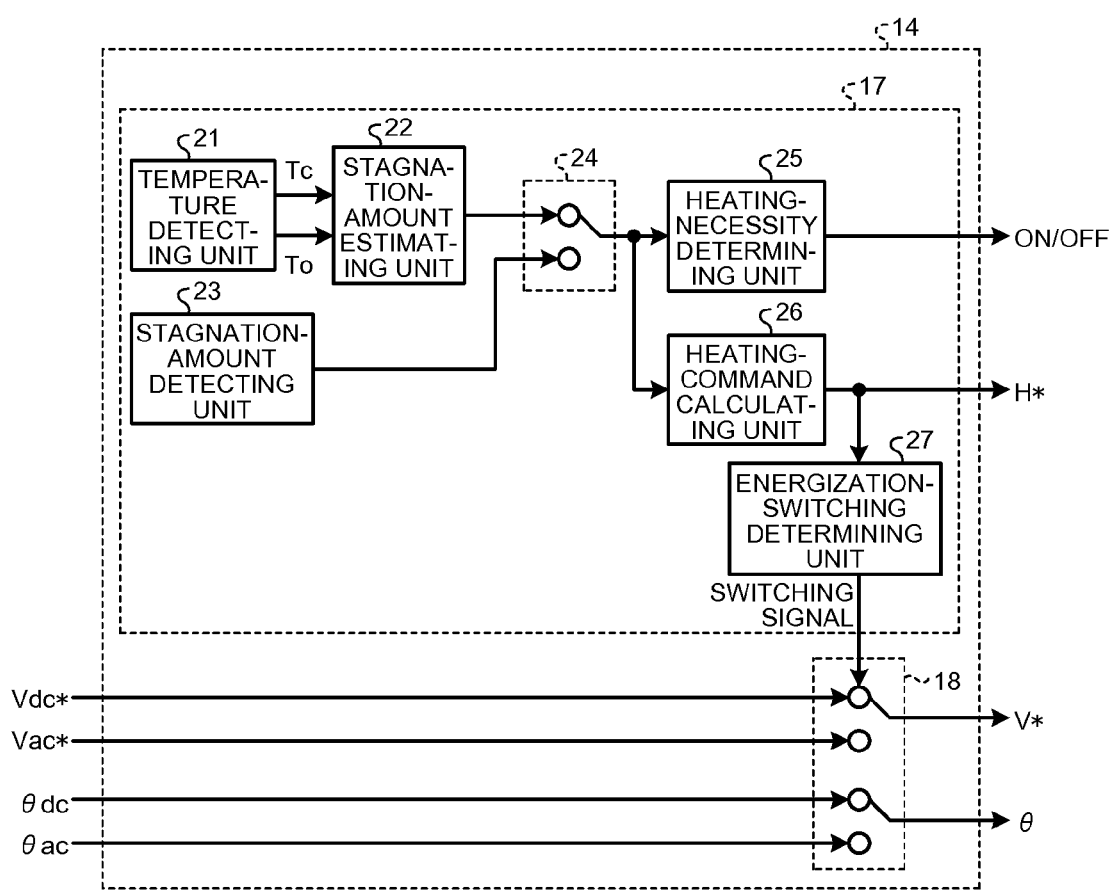
FIG. 5 is a diagram illustrating a configuration example of a heating determining unit in the first embodiment.

Next, the heating determining unit 14 will be explained in detail with reference to FIG. 5. FIG. 5 is a diagram illustrating a configuration example of the heating determining unit 14 in the present embodiment. The heating determining unit 14 includes the heating command unit 17 and the energization switching unit 18, and the heating command unit 17 includes a temperature detecting unit 21, a stagnation-amount estimating unit 22, a stagnation-amount detecting unit 23, a stagnation-determination switching unit 24, a heating-necessity determining unit 25, a heating-command calculating unit 26, and an energization-switching determining unit 27.

Figure 6:
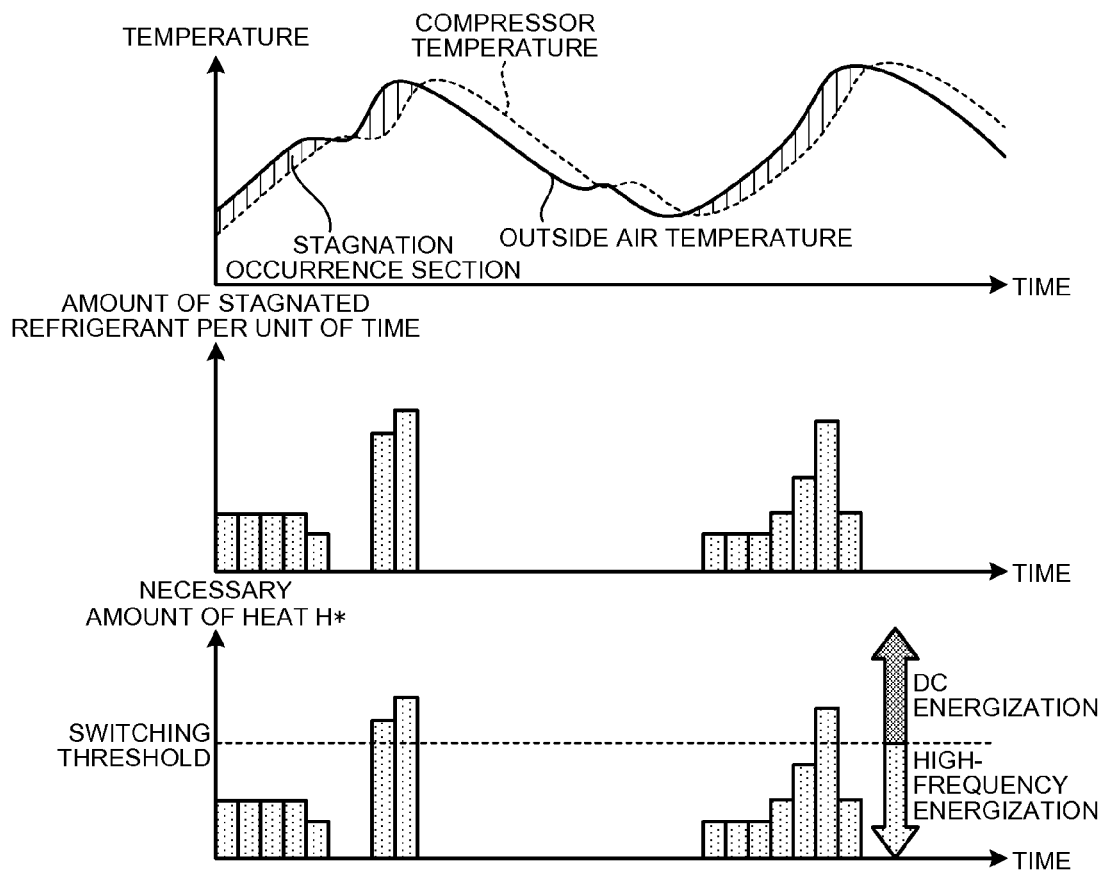
FIG. 6 is a diagram illustrating an example of the variation over time of the outside air temperature and the compressor temperature and the amount of stagnated refrigerant.

The temperature detecting unit 21 detects the outside air temperature (Tc) and the temperature (To) of the compressor 1. The stagnation-amount estimating unit 22 estimates the amount of liquid refrigerant stagnated in the compressor 1 on the basis of the outside air temperature and the temperature of the compressor 1 (compressor temperature). Because the compressor 1 has the largest heat capacity in the refrigeration cycle and the compressor temperature rises slower than the rise of the outdoor air temperature, the temperature thereof becomes the lowest in the refrigeration cycle. Therefore, the temperature relation as illustrated in FIG. 6 is obtained. FIG. 6 is a diagram illustrating an example of the variation over time of the outside air temperature and the compressor temperature and the amount of stagnated refrigerant.

As illustrated in FIG. 6, the refrigerant stagnates in the part having the lowest temperature in the refrigeration cycle, i.e., the compressor temperature, and accumulates as a liquid refrigerant; therefore, when the temperature rises, the refrigerant stagnates in the compressor 1 (the stagnation occurrence section in FIG. 6). Therefore, the stagnation-amount estimating unit 22 can estimate the amount of stagnated refrigerant per unit of time, for example, from the relation between the outside air temperature and the compressor temperature obtained by way of experiment. For example, the amount of stagnation is estimated on the basis of the difference between the outside air temperature and the compressor temperature or the change in the compressor temperature after heating is started. If the heat capacity of the compressor 1 is known, it is possible to estimate the degree of delay in the change in the compressor temperature with respect to the change in the outside air temperature only by detecting the outside air temperature. Accordingly, it is possible to reduce the number of sensors and thus reduce the cost by configuring such that only the outside air temperature is detected without detecting the temperature of the compressor 1. It is obvious that the amount of stagnation can be estimated in a similar manner by detecting the temperature of the parts forming the refrigeration cycle, the typical example of which is the heat exchanger 3.

If a sensor that detects the amount of stagnation is provided as the stagnation-amount detecting unit 23 so as to directly detect the amount of stagnated refrigerant, it is possible to obtain the amount of stagnation more accurately. Examples of sensors that detect the amount of stagnation include a capacitance sensor that measures the amount of liquid and a sensor that measures the distance between the upper portion of the compressor 1 and the liquid surface of the refrigerant with a laser, sound, electromagnetic waves, etc. The configuration may be such that the stagnation-determination switching unit 24 selects any of the outputs from the stagnation-amount estimating unit 22 and the stagnation-amount detecting unit 23. There is no problem even if control is performed by using the amount of stagnation from both the stagnation-amount estimating unit 22 and the stagnation-amount detecting unit 23.

When the heating-necessity determining unit 25 determines that heating is necessary on the basis of the amount of stagnation that is the output of the stagnation-determination switching unit 24, the heating-necessity determining unit 25 outputs an ON signal (which indicates that the heating operation is to be performed). When the heating-necessity determining unit 25 determines that heating is not necessary, the heating-necessity determining unit 25 outputs an OFF signal (which indicates that the heating operation is not performed). The heating-command calculating unit 26 calculates the necessary amount of heat H* necessary for removing the stagnated refrigerant in accordance with the amount of stagnation. The necessary amount of heat H* changes depending on the type and the size of the compressor 1. When the compressor 1 is large, is made of a low-heat-conducting material, or has a low-heat-conducting shape, the necessary amount of heat H* is set to high, thereby enabling the liquid refrigerant to be definitely discharged. The energization-switching determining unit 27 switches the energization method in such a manner that when the necessary amount of heat H* is equal to or larger than a predetermined switching threshold, the energization-switching determining unit 27 outputs, to the energization switching unit 18, a signal for switching to the DC energization, and when the necessary amount of heat H* is smaller than the switching threshold, the energization-switching determining unit 27 outputs, to the energization switching unit 18, a signal for switching to the high-frequency energization.

Figure 7:
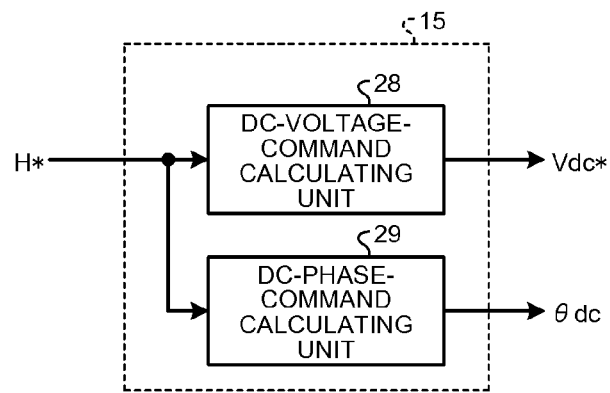
FIG. 7 is a diagram illustrating a configuration example of a DC energizing unit.

Next, the DC energizing unit 15 will be explained with reference to FIG. 7. FIG. 7 is a diagram illustrating a configuration example of the DC energizing unit 15. The DC energizing unit 15 includes a DC-voltage-command calculating unit 28 and a DC-phase-command calculating unit 29. The DC-voltage-command calculating unit 28 outputs the DC voltage command Vdc* necessary for heat generation on the basis of the necessary amount of heat H*. The DC-voltage-command calculating unit 28 can, for example, store in advance the relation between the necessary amount of heat H* and the DC voltage command Vdc* as table data and obtain thus the DC voltage command Vdc*. It is explained that the necessary amount of heat H* is input; however, it is obvious that a more accurate value can be obtained by further inputting various pieces of data, such as the outside air temperature, the compressor temperature, and information on the compressor structure, and obtaining the DC voltage command Vdc* and thus the reliability is improved.

The DC-phase-command calculating unit 29 obtains the phase θdc for energizing the motor 8. In order to apply a DC voltage, θdc is fixed. For example, when energization is performed at the position of 0° of the motor 8, θdc=0 is output. However, if energization is continuously performed at a fixed value, only a specific portion of the motor 8 may generate heat; therefore, θdc is caused to change over time so as to enable the motor 8 to be uniformly heated.

In the case of the DC energization, the DC current Idc is caused to flow to the motor 8 and thus heat is generated because of the copper loss that is due to the resistance R of the wiring of the motor 8 and is proportional to R and Idc; therefore, the compressor 1 can be heated. Thus, a large amount of heat generation can be obtained by driving the inverter 9 such that the DC current Idc increases. Accordingly, the liquified refrigerant can be discharged in a short time. However, the resistance R of the windings tends to decrease due to the recent motor 8 being of a highly efficient design. Therefore, in order to obtain the same amount of heat generation, it is necessary to increase Idc by the amount of the reduction of R. Consequently, there is a concern that the current flowing in the inverter 9 increases and thus heat is generated in the inverter 9 because of the loss deterioration. Moreover, the power consumption increases and thus it is difficult to perform the DC energization for a long period of time.

Figures 8, 9:
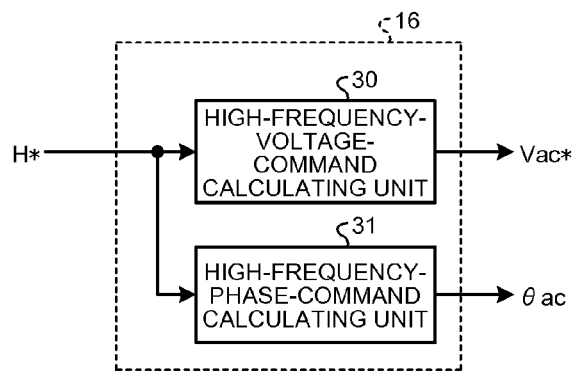
FIG. 8 is a diagram illustrating a configuration example of a high-frequency energizing unit.
FIG. 9 is a chart illustrating an example of eight switching patterns in the first embodiment.

Next, the high-frequency energizing unit 16 will be explained with reference to FIG. 8. FIG. 8 is a diagram illustrating a configuration example of the high-frequency energizing unit 16. The high-frequency energizing unit 16 includes a high-frequency-voltage-command calculating unit 30 and a high-frequency-phase-command calculating unit 31. The high-frequency-voltage-command calculating unit 30 outputs the high-frequency voltage command Vac* necessary for heat generation on the basis of the necessary amount of heat H*. The high-frequency-voltage-command calculating unit 30 can, for example, store in advance the relation between the necessary amount of heat H* and the high-frequency voltage command Vac* as table data and obtain thus the high-frequency voltage command Vac*. The necessary amount of heat H* is input; however, it is obvious that a more accurate value can be obtained by obtaining the high-frequency voltage command Vac* from various pieces of data, such as the outside air temperature, the compressor temperature, and information on the compressor structure and thus the reliability is improved.

The high-frequency-phase-command calculating unit 31 obtains the phase θac for energizing the motor 8. In order to apply a high-frequency voltage, the phase θac is continuously changed in a range of 0° to 360° over time, thereby generating a high-frequency voltage. The frequency of the high-frequency voltage can be increased by shortening the cycle of changing the phase θac in a range of 0° to 360°.

In contrast to the DC energization, in the high-frequency energization, the high-frequency current Iac is caused to flow to the motor 8 by the inverter 9; therefore, iron loss, such as eddy-current loss and hysteresis loss, is generated in the magnetic body that is the material of the stator and the rotor forming the motor 8, enabling the motor 8 to be heated. When the angular frequency ω of the high-frequency current is increased, it becomes possible to not only increase the amount of heat generation because of the increase of iron loss but also increase the impedance due to the inductance L of the motor 8; therefore, the flowing current Iac can be reduced. Thus, the motor 8 can be heated while the loss of the inverter 9 is reduced, which enables energy saving and thus can contribute to the prevention of global warming. On the other hand, when the high-frequency energization is performed, noise due to the electromagnetic sound of the motor 8 is generated; therefore, it is necessary to change the frequency such that it is close to 20 kilohertz, which is the upper limit of the audible frequency range. Consequently, when a small motor having low iron loss or a motor having a large inductance is used, there is a problem in that the necessary amount of heat cannot be obtained.

In the present embodiment, when the necessary amount of heat H* is large, the DC energization is performed to increase the amount of heat; therefore, the liquid refrigerant can be discharged in a short time. When the necessary amount of heat H* is small, the high-frequency energization is performed such that heating is performed with reduced power consumption; therefore, the liquid refrigerant can be definitely discharged and thus the reliability is improved. Moreover, it is possible to perform an operation that reduces the power consumption and contributes to the prevention of global warming. Accordingly, the above-described effects can be obtained by configuring the energization-switching determining unit 27 such that the voltage command V* and the phase command θ are obtained by switching to the DC energization by using the energization switching unit 18 when the necessary amount of heat H* is equal to or larger than the switching threshold and by switching to the high-frequency energization by using the energization switching unit 18 when the necessary amount of heat H* is smaller than the switching threshold.

The method of obtaining the voltage command V* and the phase command θ has been described; therefore, next, the method of generating the voltage command values Vu*, Vv*, and Vw* by the voltage-command generating unit 19 and the method of generating the PWM signals by the PWM-signal generating unit 20 will be explained.

When the motor 8 is a three-phase motor, the U-, V-, and W-phases are generally different from each other by 120° (=2π/3). Therefore, the voltage command values Vu*, Vv*, and Vw* are defined as cosine waves (sine waves) having phases different by 2π/3 as in the following Equations (1) to (3).

$$Vu^* = V^* \times \cos\theta \quad (1)$$

$$Vv^* = V^* \times \cos(\theta - (2/3)\pi) \quad (2)$$

$$Vw^* = V^* \times \cos(\theta + (2/3)\pi) \quad (3)$$

The voltage-command generating unit 19 calculates the voltage command values Vu*, Vv* and Vw* in accordance with Equations (1) to (3) on the basis of the voltage command value V* and the phase command θ and outputs the calculated voltage command values Vu*, Vv* and Vw* to the PWM-signal generating unit 20. The PWM-signal generating unit 20 compares the voltage command values Vu*, Vv* and Vw* with a carrier signal (reference signal) having an amplitude Vdc/2 at a predetermined frequency and generates the PWM signals UP, VP, WP, UN, VN and WN on the basis of the relation of their magnitudes to each other.

In Equations (1) to (3), the voltage command values Vu*, Vv*, and Vw* are obtained using a simple trigonometric function; however, no problem is caused even if the voltage command values Vu*, Vv*, and Vw* are obtained using other methods, such as a two-phase modulation, a third-harmonic superposition modulation, and a space vector modulation.

When the voltage command value Vu* is larger than the carrier signal, UP is set to a voltage for turning on the switching element 91a and UN is set to a voltage for turning off the switching element 91d. When the voltage command value Vu* is smaller than the carrier signal, conversely, UP is set to a voltage for turning off the switching element 91a and UN is set to a voltage for turning on the switching element 91d. The same applies to the other signals. Specifically, VP and VN are determined by comparing the voltage command value Vv* and the carrier signal and WP and WN are determined by comparing the voltage command value Vw* and the carrier signal.

In the case of general inverters, because a complementary PWM system is adopted, UP and UN, VP and VN, and WP and WN have an inverse relationship to each other. Therefore, there are eight switching patterns in total.

FIG. 9 is a chart illustrating an example of eight switching patterns in the present embodiment. In FIG. 9, reference symbols V0 to V7 denote voltage vectors generated in the respective switching patterns. The voltage directions of the respective voltage vectors are indicated by ±U, ±V, and ±W (and 0 when the voltage is not generated). Here, "+U" means a voltage for generating a current in the U-phase direction, which flows into the motor 8 via the U-phase and flows out of the motor 8 via the V-phase and the W-phase, and "−U" means a voltage for generating a current in the −U phase direction, which flows into the motor 8 via the V-phase and the W-phase and flows out of the motor 8 via the U-phase. The signs ±V and ±W also indicate the directions in the respective phases in a similar manner.

The inverter 9 can be caused to output desired voltages by combining the switching patterns illustrated in FIG. 9 and outputting a voltage vector. When the refrigerant in the compressor 1 is compressed by the motor 8 (normal operation mode), the motor 8 is typically operated at a frequency between several tens of hertz and several kilohertz. When the applied voltage in the normal operation mode has a frequency between several tens of hertz and several kilohertz, in the heating operation mode, a DC voltage is generated by setting the phase θ to a fixed value and thus the compressor 1 can be heated. Moreover, a high-frequency voltage (high-frequency AC voltage) exceeding several kilohertz can be output by changing θ at high speed and the compressor 1 can be energized and heated. The high-frequency voltage may be applied to three phases or two phases.

Figure 10:
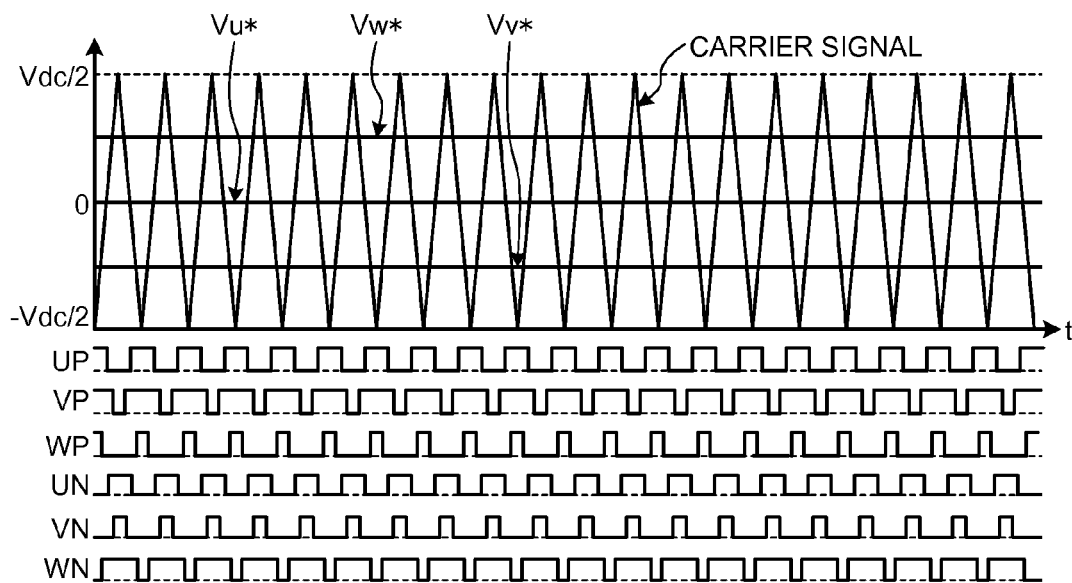
FIG. 10 is a diagram illustrating an example of an operation waveform when a DC energization is selected by an energization switching unit.

FIG. 10 is a diagram illustrating an example of an operation waveform when the DC energization is selected by the energization switching unit 18. When θ is set to 90°, then Vu*=0, Vv*=−0.5V*, and Vw*=0.5V*, which are compared with the carrier signal (reference signal) to obtain the PWM signals illustrated in FIG. 10. Accordingly, the voltage vectors V0 (0 voltage), V2 (+V voltage), V6 (−W voltage), and V7 (0 voltage) illustrated in FIG. 9 are output; therefore, a DC current can be caused to flow to the motor 8.

Figure 11:
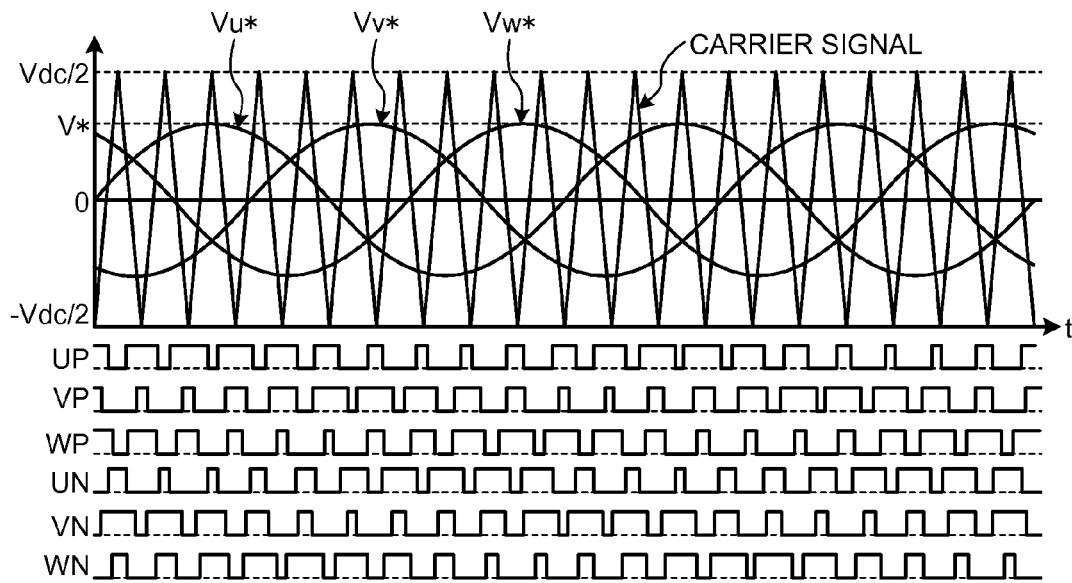
FIG. 11 is a diagram illustrating an example of an operation waveform when a high-frequency energization is selected by the energization switching unit.

FIG. 11 is a diagram illustrating an example of an operation waveform when the high-frequency energization is selected by the energization switching unit 18. Because θ is set between 0° and 360°, Vu*, Vv*, and Vw* are cosine (sine) waves having phases different by 120°, respectively, which are compared with the carrier signal (reference signal) to obtain the PWM signals illustrated in FIG. 11. Therefore, the voltage vector changes over time and thus the high-frequency current can be caused to flow to the motor 8.

However, in the case of general inverters, the carrier frequency, which is the frequency of the carrier signal, has an upper limit due to the switching speed of the switching elements of the inverters. Therefore, it is difficult to output a high-frequency voltage having a frequency equal to or higher than the carrier frequency. In the case of general IGBTs (Insulated Gate Bipolar Transistors), the upper limit of the switching speed is about 20 kilohertz.

When the frequency of the high-frequency voltage becomes about 1/10 of the carrier frequency, adverse effects may occur such as deterioration of the waveform output accuracy of the high-frequency voltage and superposition of DC components. In view of the above, when the carrier frequency is set to 20 kilohertz, if the frequency of the high-frequency voltage is set equal to or lower than 2 kilohertz, which is 1/10 of the carrier frequency, then the frequency of the high-frequency voltage falls within the audible frequency range and therefore noise may increase.

Figure 12:
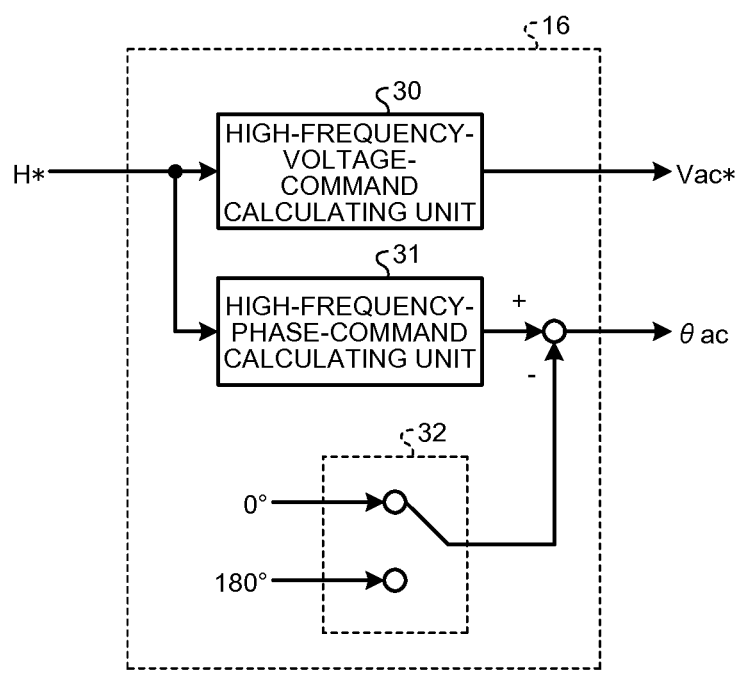
FIG. 12 is a diagram illustrating a configuration example of the high-frequency energizing unit that includes a high-frequency phase switching unit.

Therefore, as illustrated in FIG. 12, the high-frequency energizing unit 16 may be configured such that the output of a high-frequency phase switching unit 32, which switches between 0° and 180° and outputs either of them, is added to the output of the high-frequency-phase-command calculating unit 31 and the resultant is output as the high-frequency phase command θac. FIG. 12 is a diagram illustrating a configuration example of such a high-frequency energizing unit 16. In the configuration example in FIG. 12, the high-frequency-phase-command calculating unit 31 outputs a fixed value to output only a phase at which the motor 8 is energized. The high-frequency phase switching unit 32 switches between 0° and 180° at the timing of the top or the bottom of the carrier signal and outputs positive and negative voltages in synchronization with the carrier signal, thereby enabling the voltage having a frequency equivalent to the carrier frequency to be output.

Figure 13:
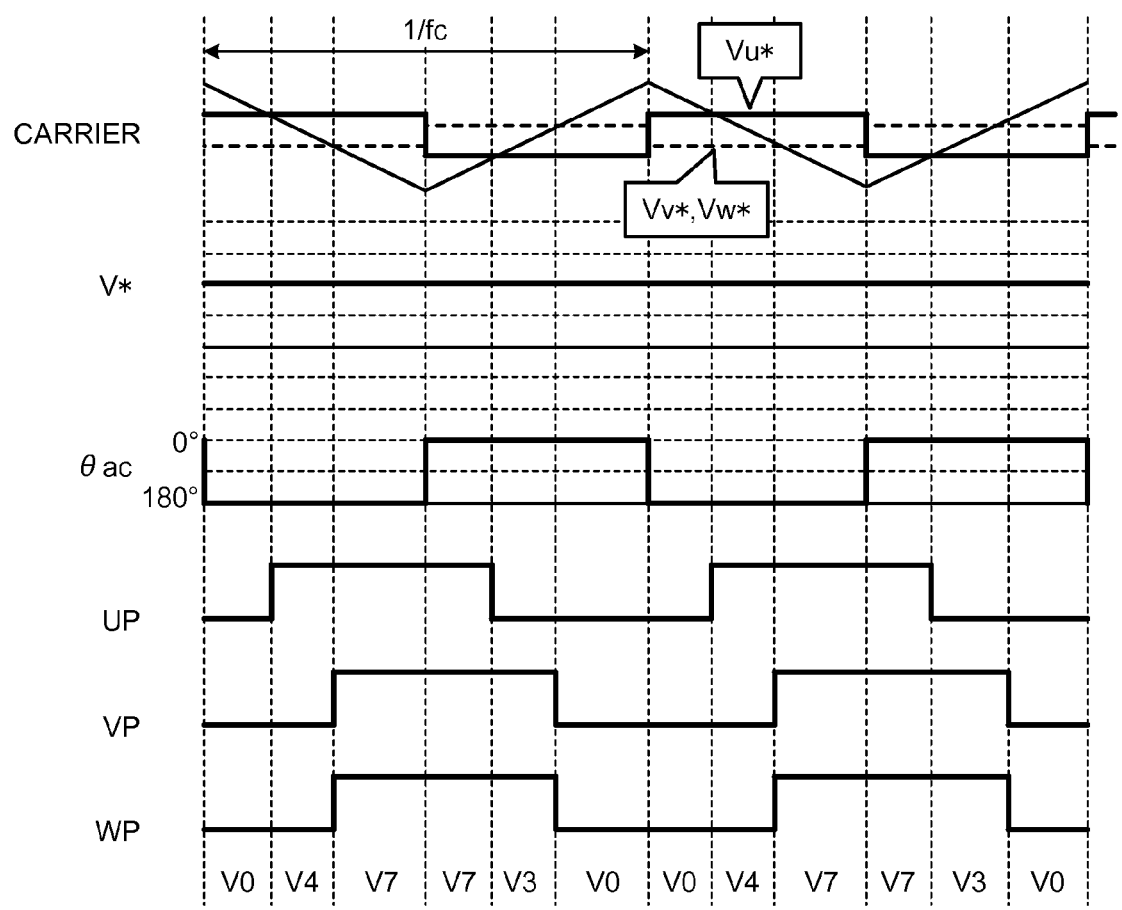
FIG. 13 is a diagram illustrating the operation when V* is an arbitrary value and the output of a high-frequency-phase-command calculating unit is 0°.

FIG. 13 is a diagram illustrating an operation when V* is an arbitrary value and the output of the high-frequency-phase-command calculating unit 31 is 0°. The PWM signals synchronized with the carrier signal can be output by switching the high-frequency phase command θac between 0° and 180° at the timing of the top, the bottom, or the top and bottom of the carrier signal. In this case, the voltage vector changes in the order of V0 (UP=VP=WP=0), V4 (UP=1, VP=WP=0), V7 (UP=VP=WP=1), V3 (UP=0, VP=WP=1), V0 (UP=VP=WP=0), and so on.

Figure 14:
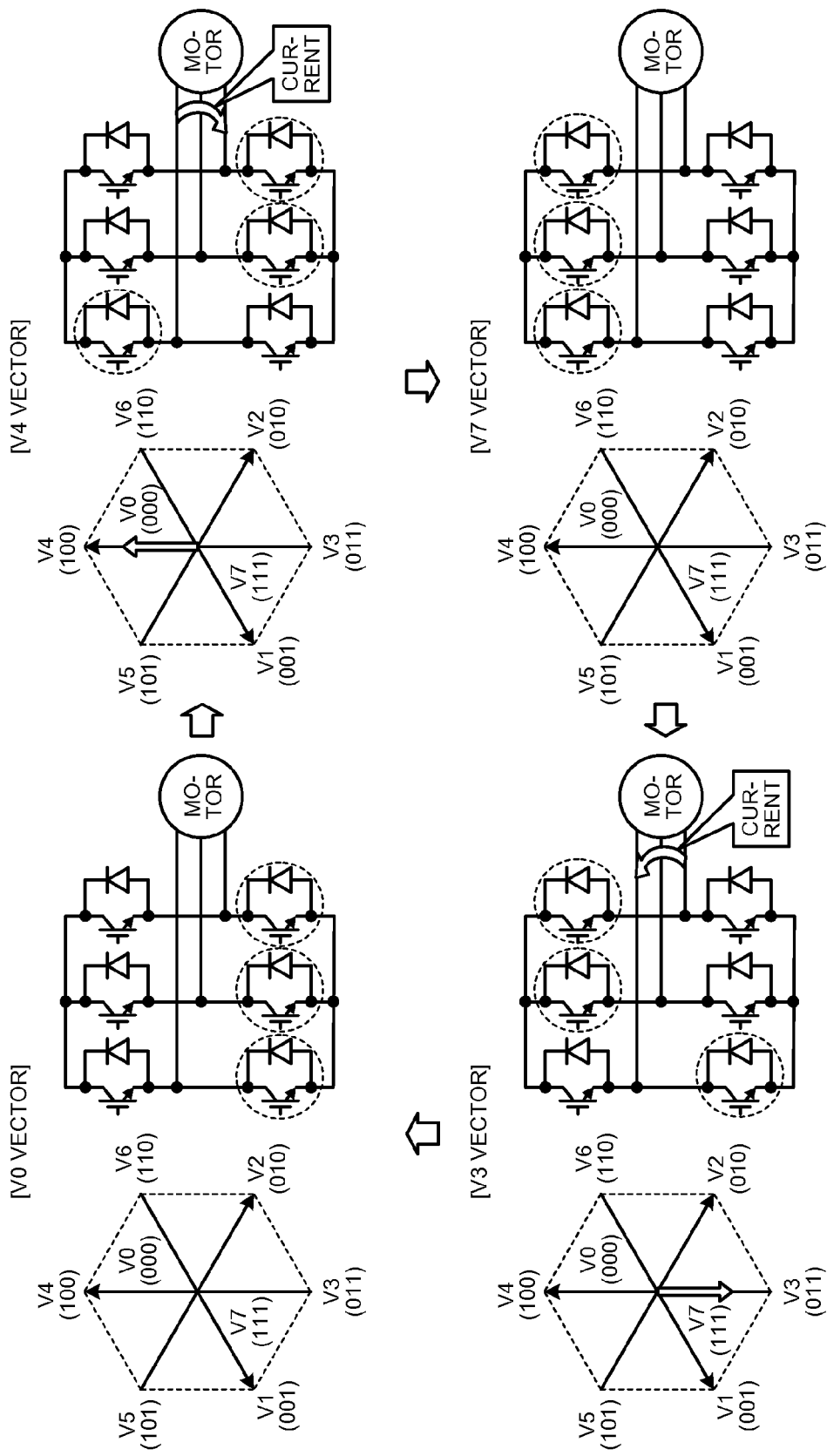
FIG. 14 is an explanatory diagram of a change of a voltage vector illustrated in FIG. 13.

FIG. 14 is an explanatory diagram of a change of the voltage vector illustrated in FIG. 13. In FIG. 14, the switching elements 91 being surrounded by broken lines are on and the switching elements 91 not being surrounded by broken lines are off. As illustrated in FIG. 14, when the V0 vector or the V7 vector is applied, the lines of the motor 8 are short-circuited and any voltage is not output. In this case, the energy accumulated in the inductance of the motor 8 becomes a current and the current flows in the short circuit. When the V4 vector is applied, a current (current of +Iu) in the U-phase direction, which flows into the motor 8 via the U-phase and flows out of the motor 8 via the V-phase and the W-phase, flows, and when the V3 vector is applied, a current (current of −Iu) in the −U phase direction, which flows into the motor 8 via the V-phase and the W-phase and flows out of the motor 8 via the U-phase, flows to the windings of the motor 8. In other words, when the V4 vector is applied, a current flows to the windings of the motor 8 in the opposite direction to the case when the V3 vector is applied. Because the voltage vector changes in order of V0, V4, V7, V3, V0, and so on, the current of +Iu and the current of −Iu flow to the windings of the motor 8 alternately. Particularly, as illustrated in FIG. 13, the V4 vector and the V3 vector appear during one carrier cycle (1/fc); therefore, an AC voltage synchronized with the carrier frequency fc can be applied to the windings of the motor 8.

Because the V4 vector (current of +Iu) and the V3 vector (current of −Iu) are alternately output, forward and reverse torques are switched instantaneously. Thus, the torques cancel each other out; therefore, a voltage can be applied such that vibrations of the rotor are suppressed.

Figure 15:
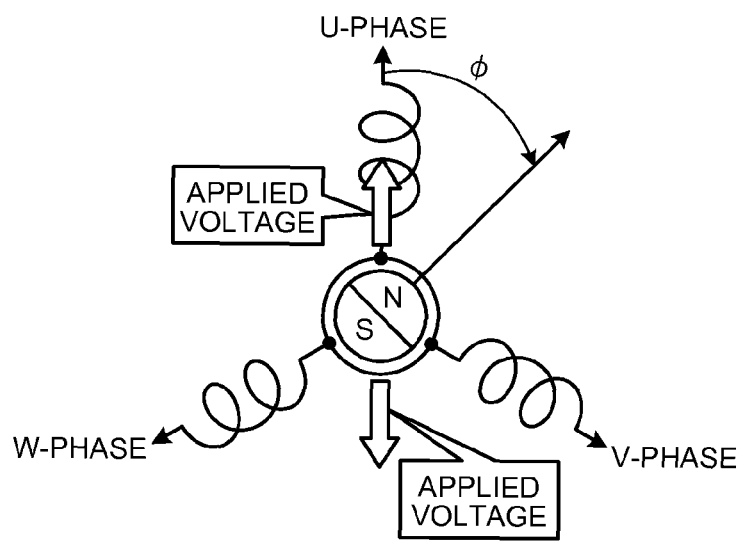
FIG. 15 is an explanatory diagram of the position of a rotor of an IPM motor.

FIG. 15 is an explanatory diagram of the position of a rotor (stop position of a rotor) of an IPM (Interior Permanent Magnet) motor. In this embodiment, the rotor position ϕ of the IPM motor is indicated by the size of the angle by which the direction of the N pole of the rotor deviates from the U-phase direction.

Figure 16:
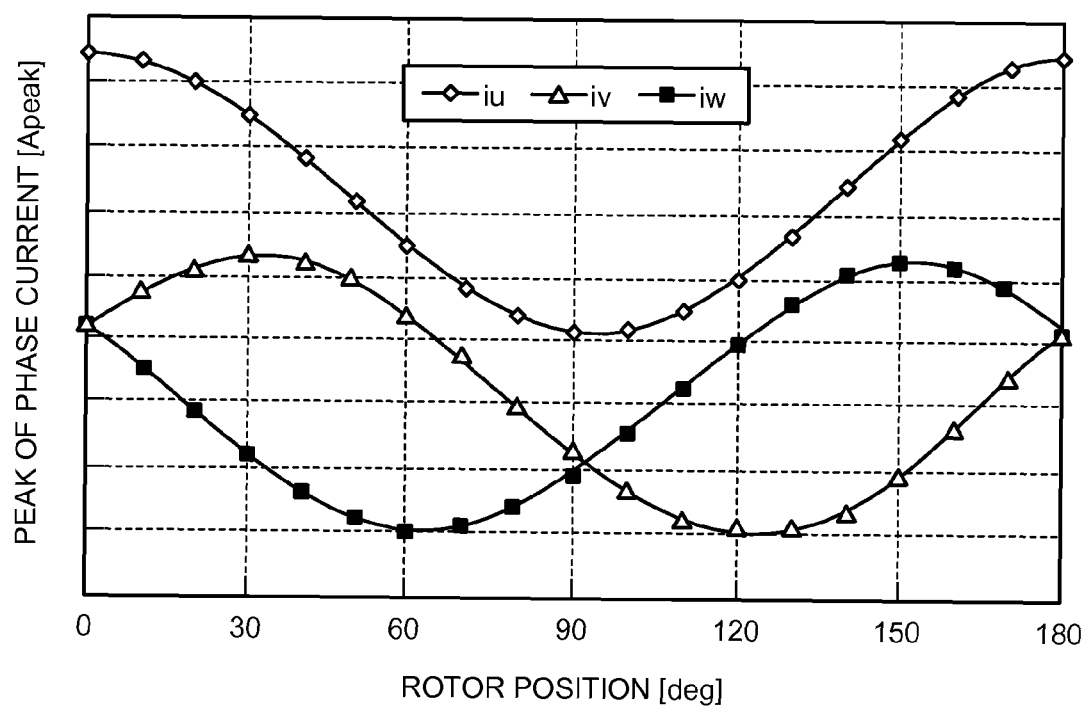
FIG. 16 is a diagram illustrating the current change depending on the position of the rotor of the IMP motor.

FIG. 16 is a graph illustrating the current change depending on the position of the rotor of the IMP motor. When the motor 8 is the IMP motor, the wiring inductance depends on the rotor position. Therefore, the wiring impedance represented by the product of the electrical angular frequency ω and the inductance value changes depending on the rotor position. Consequently, even when the same voltage is applied, the current flowing in the wiring of the motor 8 changes depending on the rotor position and thus the amount of heat changes. As a result, a large amount of electric power may be consumed to obtain the necessary amount of heat depending on the rotor position.

Figure 17:
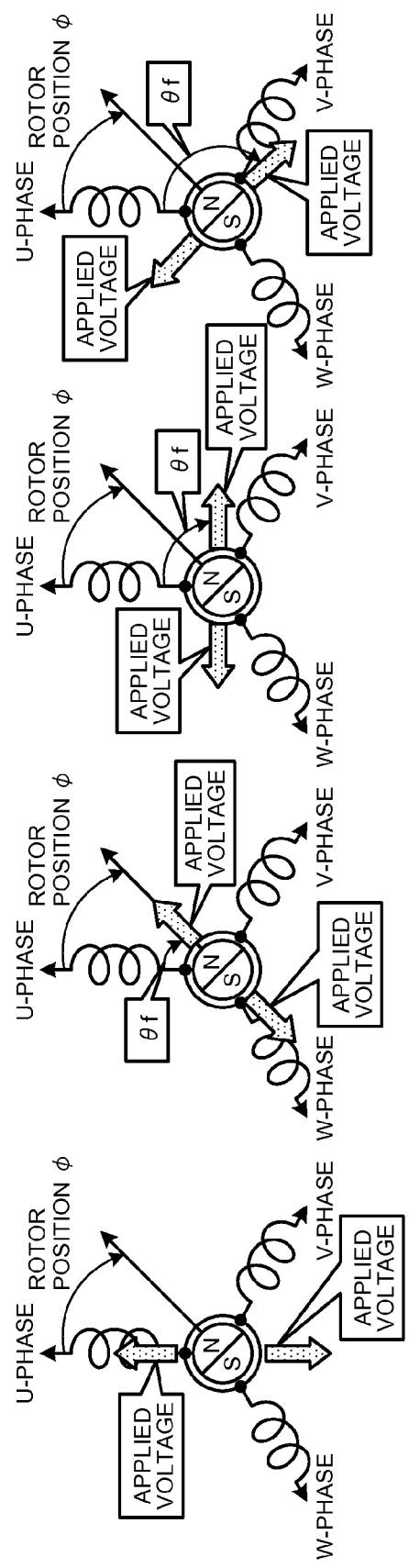
FIG. 17 is a diagram illustrating an applied voltage when θf is changed over time.

Therefore, in the present embodiment, the output (referred to as θf) of the high-frequency-phase-command calculating unit 31 is changed over time so as to evenly apply a voltage to the rotor. FIG. 17 is a diagram illustrating applied voltages when θf is changed over time. In this embodiment, θf is changed over time in increments of 45 degrees, i.e., 0 degrees, 45 degrees, 90 degrees, 135 degrees, and so on. When θf is 0 degrees, the phase θ of the voltage command value is 0 degrees or 180 degrees. When θf is 45 degrees, the phase θ of the voltage command value is 45 degrees or 225 degrees. When θf is 90 degrees, the phase θ of the voltage command value is 90 degrees or 270 degrees. When θf is 135 degrees, the phase θ of the voltage command value is 135 degrees or 315 degrees.

In other words, θf is initially set to 0 degrees, and the phase θ of the voltage command value is switched between 0 degrees and 180 degrees in synchronization with the carrier signal for a predetermined period of time. Thereafter, θf is switched to 45 degrees, and the phase θ of the voltage command value is switched between 45 degrees and 225 degrees in synchronization with the carrier signal for a predetermined period of time. Subsequently, θf is switched to 90 degrees, and so on. In this manner, the phase θ of the voltage command value is switched between 0 degrees and 180 degrees, between 45 degrees and 225 degrees, between 90 degrees and 270 degrees, between 135 degrees and 315 degrees, and so on for each predetermined period of time. Accordingly, because the energization phase of the high-frequency AC voltage changes over time, it is possible to eliminate the effect of the inductance characteristics caused by the rotor stop position. Thus, the compressor 1 can be uniformly heated regardless of the rotor position.

Figure 18:
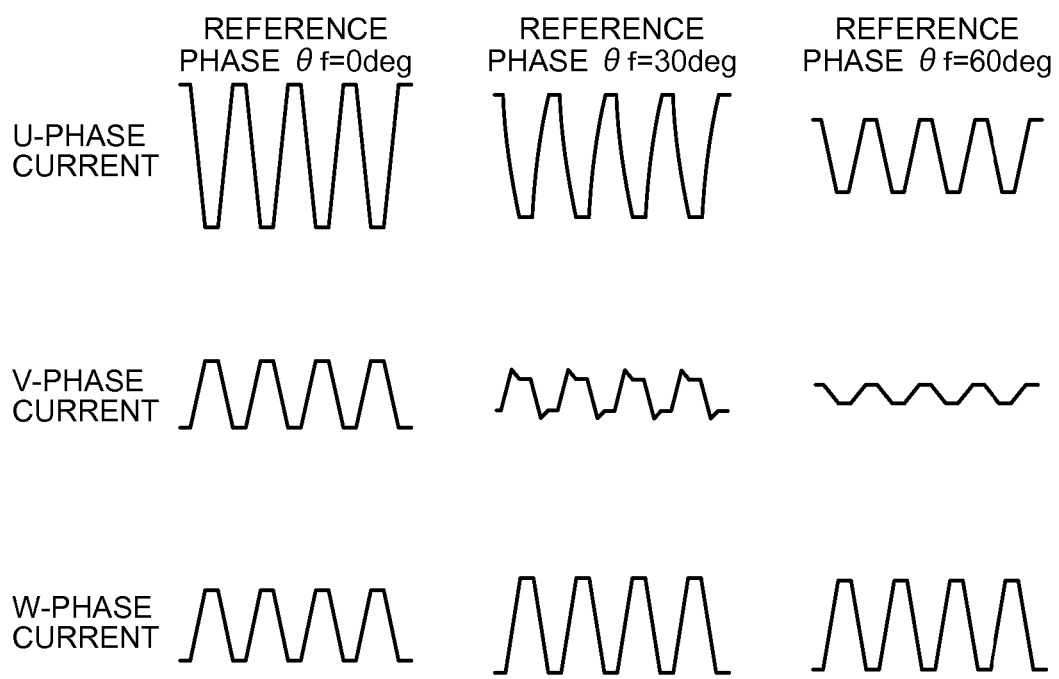
FIG. 18 is a diagram illustrating an example of the current flowing in respective phases UVW of the motor when θf is 0 degrees, 30 degrees, and 60 degrees.

FIG. 18 is a diagram illustrating an example of a current flowing to the respective U-, V- and W-phases of the motor 8 when θf is 0 degrees (the U-phase (V4) direction is 0 degrees), 30 degrees, and 60 degrees. When θf is 0 degrees, as illustrated in FIG. 18, only one other voltage vector (a voltage vector with which, among the switching elements

91a to 91f, one switching element on the positive voltage side and two switching elements on the negative voltage side are on or two switching elements on the positive voltage side and one switching element on the negative voltage side are on) is generated between V0 and V7. In such a case, the current waveform becomes a trapezoidal shape and thus the current has a small number of harmonic components.

However, when θf is 30 degrees, two different voltage vectors are generated between V0 and V7. In such a case, the current waveform is distorted and thus the current has a large number of harmonic components. The distortion of the current waveform may cause adverse effects, such as motor noise and motor shaft vibration.

When θf is 60 degrees, as in the case of θf being 0 degrees, only one other voltage vector is generated between V0 and V7. In such a case, the current waveform becomes a trapezoidal shape and thus the current has a small number of harmonic components.

As described above, when the reference phase θf is n (n is an integer of 0 or larger) multiples of 60 degrees, the voltage phase θ becomes a multiple of 60 degrees (in this example, θp=0 [degrees] and θn=180 [degrees]); therefore, only one other voltage vector is generated between V0 and V7. In contrast, when the reference phase θf is not n multiples of 60 degrees, the voltage phase θ does not become a multiple of 60 degrees; therefore, two other voltage vectors are generated between V0 and V7. If two other voltage vectors are generated between V0 and V7, the current waveform is distorted and the current has a large number of harmonic components. Consequently, the current waveform may cause adverse effects, such as motor noise and motor shaft vibration. Therefore, it is desirable that the reference phase θf is changed in increments of n multiples of 60 degrees, such as 0 degrees, 60 degrees, and so on.

Figure 19:
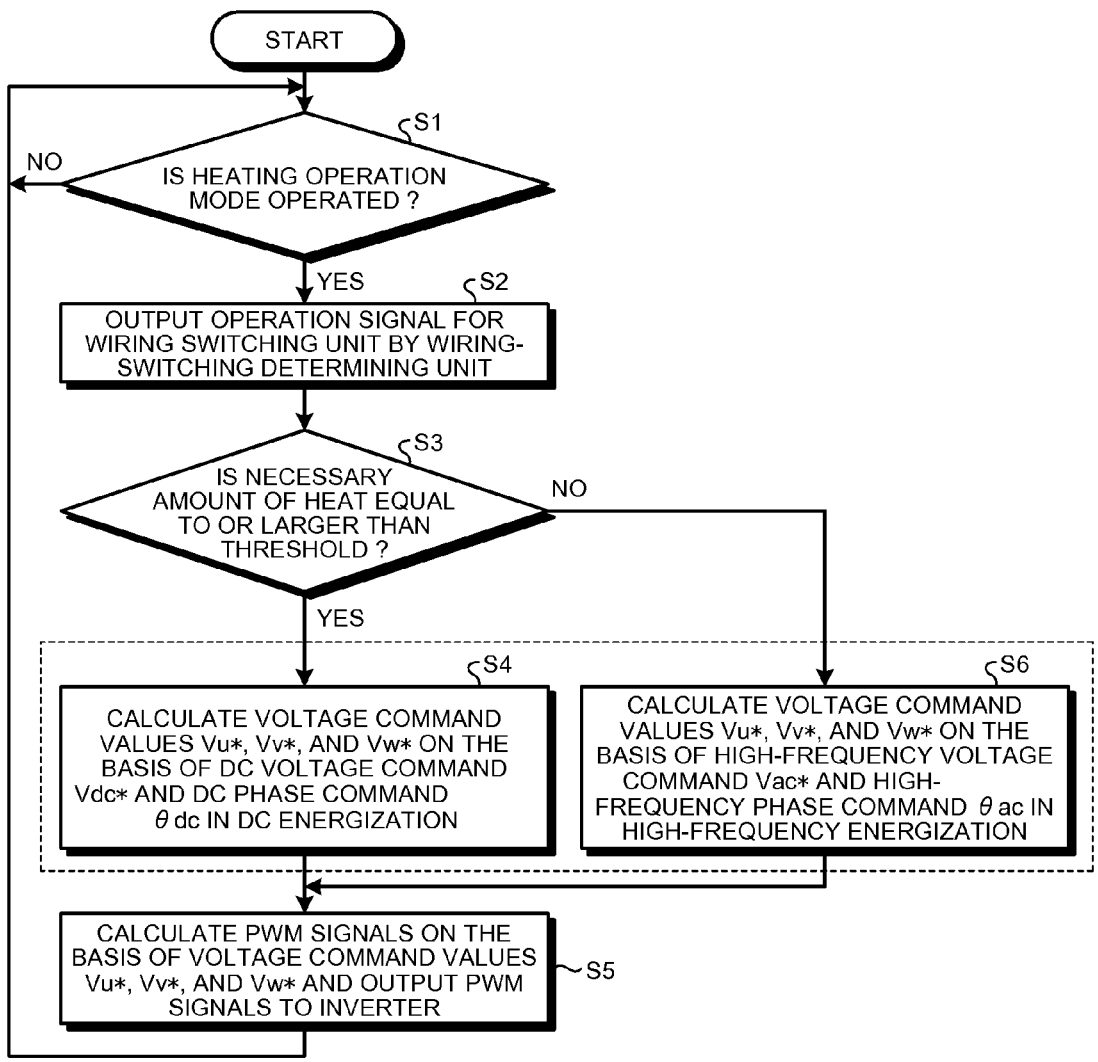
FIG. 19 is a flowchart illustrating an example of the operation of the inverter control unit in the first embodiment.

Next, the operation of the inverter control unit 10 will be explained. FIG. 19 is a flowchart illustrating an example of the operation of the inverter control unit 10 in the present embodiment. The heating determining unit 14 determines whether to operate the heating operation mode by performing the operation described above while the operation of the compressor 1 is stopped (Step S1: heating determining step).

When the heating-necessity determining unit 25 determines that the heating operation mode is to be operated (Yes at Step S1), the heating-necessity determining unit 25 notifies the wiring-switching determining unit 34 of the operation mode information indicating the heating mode and the wiring-switching determining unit 34 operates the wiring switching unit 33 to switch the motor wirings from a Y-connection to a Δ-connection (Step S2: wiring switching step).

Next, it is determined whether the necessary amount of heat H*, which is the output of the heating-command calculating unit 26, is equal to or larger than the threshold (Step S3: energization switching step). When the necessary amount of heat H* is equal to or larger than the threshold (Yes at Step S3), the energization switching unit 18 selects the DC energization and sets Vdc* and θdc as V* and θ, and the voltage-command generating unit 19 calculates the voltage command values Vu*, Vv*, and Vw* (Step S4). Then, the PWM-signal generating unit 20 compares the voltage command values Vu*, Vv*, and Vw* output from the voltage-command generating unit 19 with the carrier signal to obtain the PWM signals UP, VP, WP, UN, VN, and WN and outputs them to the inverter 9 (Step S5). Then, the process returns to Step S1.

At Step S1, when the heating-necessity determining unit 25 determines that the heating operation mode is not to be operated (No at Step S1), the process returns to Step S1 and, after the lapse of a predetermined period of time, the heating-necessity determining unit 25 determines whether to operate the heating operation mode again.

At Step S3, when it is determined that the necessary amount of heat H* is smaller than the threshold (No at Step S3), the energization switching unit 18 switches to the high-frequency energization and sets Vac* and θac as V* and θ, and the voltage-command generating unit 19 calculates the voltage command values Vu*, Vv*, and Vw* (Step S6). Then, the process proceeds to Step S5.

With the above operation, in the heating operation mode, the switching elements 91a to 91f of the inverter 9 are driven to cause a DC current or a high-frequency current to flow to the motor 8. When the DC energization is selected, the motor 8 can generate heat due to the copper loss due to the DC current and can supply a large amount of electric power. Therefore, the motor 8 can be heated in a short time. Accordingly, the liquid refrigerant stagnated in the compressor 1 can be heated and vaporized and can be discharged to the outside of the compressor 1 in a short time. Moreover, when the high-frequency energization is selected, the motor 8 can be heated efficiently not only due to the iron loss due to the high-frequency current but also due to the copper loss due to the current flowing in the wirings. Therefore, the motor 8 can be heated with the minimum necessary amount of power consumption. Accordingly, the liquid refrigerant stagnated in the compressor 1 can be heated and vaporized and can be discharged to the outside of the compressor 1.

As described above, in the heat pump device 100 according to the present embodiment, when a liquid refrigerant is stagnated in the compressor 1, a current having a frequency outside the audible frequency range (20 hertz to 20 kilohertz) is caused to flow to the motor 8 by performing the DC energization or the high-frequency energization, whereby it is possible to, while suppressing noise, efficiently heat the motor 8 by switching energization according to the demand, that is, switching to the DC energization when the necessary amount of heat is large and switching to the high-frequency energization, which is highly efficient, when the necessary amount of heat is small. Accordingly, the refrigerant stagnated in the compressor 1 can be heated efficiently and thus the stagnated refrigerant can be discharged to the outside of the compressor 1.

In the case of the DC energization, a DC current flows to the motor; therefore, the rotor of the motor 8 can be fixed at a predetermined position by the DC excitation. Thus, the rotor does not rotate and vibrate.

In the case of the high-frequency energization, if a high-frequency voltage having the operation frequency that is used during the compression operation or higher is applied to the motor 8, the rotor in the motor 8 cannot follow the frequency; therefore, the rotor does not rotate and vibrate. Accordingly, it is desirable that the frequency of the voltage output from the inverter 9 is equal to or higher than the operation frequency during the compression operation.

Generally, the operation frequency during the compression operation is 1 kilohertz at most. Therefore, a high-frequency voltage having a frequency equal to or higher than 1 kilohertz only has to be applied to the motor 8. If a voltage having a frequency equal to or higher than 14 kilohertz is applied to the motor 8, vibration sound of the iron core of the motor 8 nearly approaches the upper limit of the audible frequency range. Therefore, noise can be reduced. Thus, for example, a high-frequency voltage of about 20 kilohertz, which is outside the audible frequency range, is output.

However, when the frequency of the high-frequency voltage exceeds the maximum rated frequency of the switching elements 91a to 91f, a load or power supply short-circuit may occur due to the damage to the switching elements 91a to 91f, and this may lead to the generation of smoke or start of a fire. For this reason, it is desired to set the frequency of the high-frequency voltage to be equal to or lower than the maximum rated frequency, thereby ensuring the reliability.

Furthermore, in order to achieve a high efficiency, a motor having an IPM structure or a concentrated winding motor having a small coil end and a low winding resistance have been widely used for the motor 8 of the compressor 1 for recent heat pump devices. The concentrated winding motor has a low winding resistance and a small amount of heat generation due to copper loss, and thus a large amount of current needs to be caused to flow to the windings. If a large amount of current is caused to flow to the windings, then the current flowing to the inverter 9 also increases, which results in an increase in inverter loss.

Therefore, normally, if heating by the high-frequency energization is performed in the heating operation mode, an inductance component due to the high frequency increases, thereby increasing the winding impedance. Accordingly, although the current flowing to the windings decreases and the copper loss is reduced, iron loss due to the application of the high-frequency voltage is generated corresponding to the amount of reduced copper loss; therefore, heating can be performed efficiently. Furthermore, because the current flowing to the windings decreases, the current flowing to the inverter also decreases. Thus, the loss of the inverter 9 can be reduced and heating can be performed more efficiently.

When heating by the high-frequency energization described above is performed, if the compressor 1 has a motor having an IPM structure, the rotor surface where the high-frequency magnetic fluxes interlink with each other also becomes a heat generating portion. Therefore, an increase in the area contacting the refrigerant and prompt heating of the compression mechanism can be realized. Thus, the refrigerant can be heated efficiently. However, in the case of the high-frequency energization, if the impedance becomes excessively high, it becomes difficult to obtain the necessary amount of heat. Therefore, when a large amount of heat is needed, energization is switched to the DC energization. Accordingly, the liquid refrigerant stagnated in the compressor 1 can be definitely vaporized and can be discharged to the outside of the compressor 1.

Instead of switching between the DC energization and the high-frequency energization, the inverter control unit 10 may be operated such that a direct current and a high-frequency current flow at the same time. In such a case, energization can be performed such that both an increase in the amount of heat, which is an advantage in the case of the DC energization, and a loss reduction, which is an advantage in the case of the high-frequency energization, are obtained. Moreover, when the high-frequency energization is performed without using the DC energization in the heating operation mode, the wiring switching in the present embodiment may be used.

Currently, it is typically mainstream to use semiconductors made of silicon (Si) as a material for the switching elements 91a to 91f that constitute the inverter 9 and the reflux diodes 92a to 92f that are connected to the respective switching elements 91a to 91f in parallel. However, instead of the above semiconductor, a wide gap semiconductor whose material is silicon carbide (SiC), gallium nitride (GaN) or diamond may be used.

Switching elements and diode elements made from such a wide bandgap semiconductor have a high voltage resistance and a high allowable current density. Therefore, downsizing of the switching elements and the diode elements is possible, and by using these downsized switching elements and diode elements, downsizing of a semiconductor module in which these elements are incorporated therein can be realized.

The switching elements and the diode elements made from such a wide bandgap semiconductor have a high heat resistance. Accordingly, downsizing of a radiator fin of a heat sink and air cooling of a water cooling part can be realized, thereby enabling further downsizing of a semiconductor module.

Furthermore, the switching elements and the diode elements made from such a wide bandgap semiconductor have low power loss. Therefore, the switching elements and the diode elements can be made to have a high efficiency, thereby enabling a semiconductor module to be highly efficient.

Moreover, because switching can be performed at high frequency, a current with a higher frequency can be caused to flow to the motor 8. Therefore, the current flowing to the inverter 9 can be reduced because of the reduction of the wiring current due to the increase of the wiring impedance of the motor 8. Accordingly, it is possible to obtain a heat pump device with a higher efficiency. Furthermore, because the frequency can be increased easily, there is an advantage in that the frequency exceeding the audible frequency range can be easily set and thus it becomes easy to take measures against noise.

Moreover, the power loss is reduced also when the DC energization is performed. Therefore, heat generation is reduced. Moreover, for example, there are advantages in that even if a large current flows, the heat resistance performance increases and damage due to heat generation does not occur easily.

While it is desirable that both the switching elements and the diode elements are made from a wide bandgap semiconductor, it is also sufficient that either the switching elements or the diode elements are made from a wide bandgap semiconductor, and even in this case, the effects described in the present embodiment can be obtained.

Furthermore, similar effects can be obtained by using a MOSFET (Metal-Oxide-Semiconductor Field-Effect Transistor) having a super junction structure that is known as a highly efficient switching element.

In a compressor having a scroll mechanism, it is difficult to relieve high pressure in the compression chamber. Therefore, there is a high possibility of causing damage to the compression mechanism due to the excessive stress applied to the compression mechanism in the case of liquid compression, as compared to a compressor of other systems. However, in the heat pump device 100 according to the present embodiment, efficient heating of the compressor 1 is possible, and stagnation of the liquid refrigerant in the compressor 1 can be suppressed. Accordingly, liquid compression can be prevented; therefore, the heat pump device 100 is beneficial even when a scroll compressor is used as the compressor 1.

Furthermore, in the case of the high-frequency energization, when a heating device having a frequency of 10 kHz and an output exceeding 50 W is used, the heating device may be subjected to the restriction of laws and regulations. For this reason, it may be as well to admit that the voltage command V* is adjusted in advance such that the output does not exceed 50 W and/or feedback control is executed with the detection of flowing current and voltage such that the output is 50 W or less.

In the present embodiment, the high-frequency energization and the DC energization are switched; however, only either of the methods may be performed.

The inverter control unit 10 can be configured from a discrete system of a CPU (Central Processing Unit), a DSP (Digital Signal Processor), or a microcomputer. Alternatively, the inverter control unit 10 may be, for example, configured from the electrical circuit elements of an analog circuit, a digital circuit, or the like.

Second Embodiment

Figure 20:
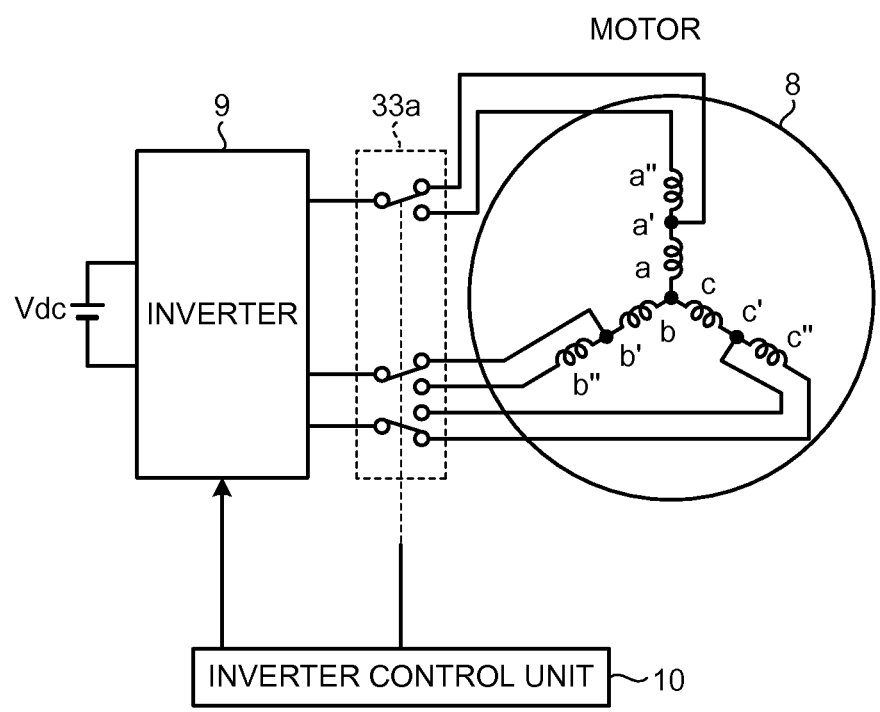
FIG. 20 is a diagram illustrating a configuration example of a wiring switching unit in a second embodiment.

FIG. 20 is a diagram illustrating a configuration example of a wiring switching unit 33a in a second embodiment of the heat pump device according to the present invention. The heat pump device according to the present embodiment is similar to the heat pump device according to the first embodiment except that the wiring switching unit 33 is changed to the wiring switching unit 33a. Components having the same functions as those in the first embodiment are denoted by reference numerals and signs that are the same as those in the first embodiment and redundant explanation thereof is omitted.

Figure 21:
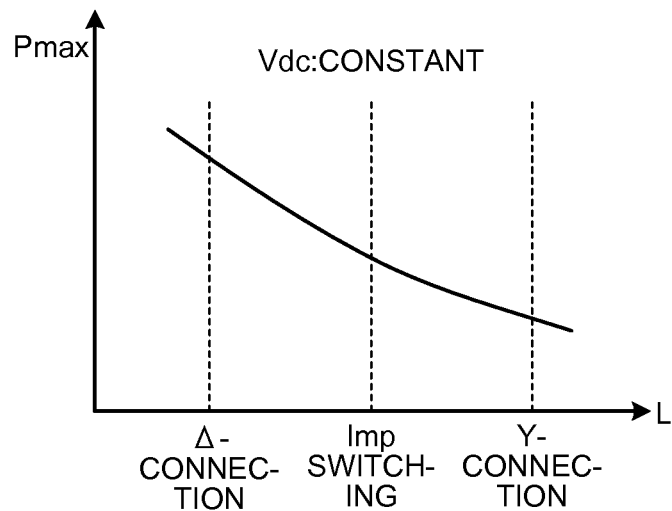
FIG. 21 is a diagram illustrating an example of the relation between inductance L and a maximum electric power Pmax.
Figure 22:
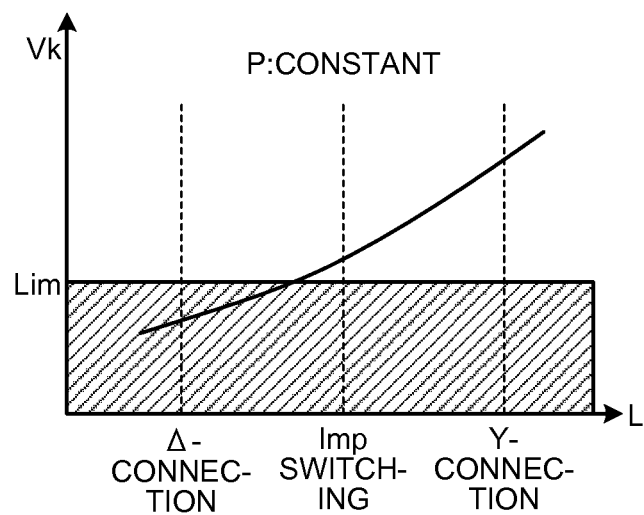
FIG. 22 is a diagram illustrating an example of a voltage command Vk with respect to the inductance L.
Figures 1, 23:
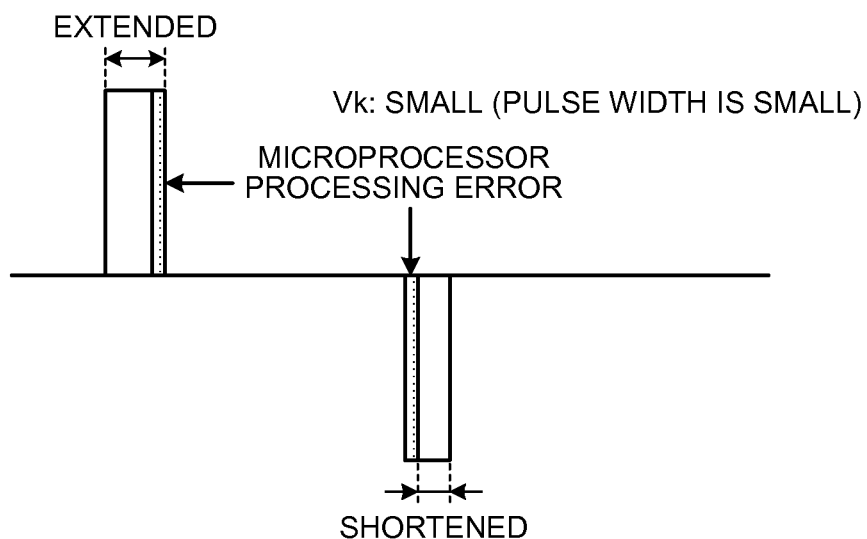
Figures 2, 23:
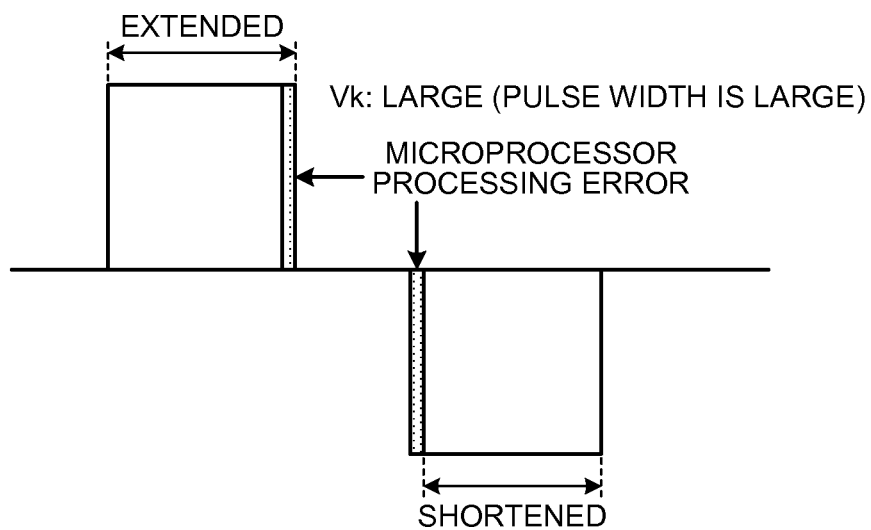

FIG. 21 is a diagram illustrating an example of the relation between the inductance L and the maximum electric power Pmax, which are the main factors of the impedance in the heating operation mode by the high-frequency energization. In FIG. 21, the bus voltage Vdc is fixed. FIG. 22 is a diagram illustrating an example of a voltage command Vk (modulation degree) with respect to the inductance L. In FIG. 22, the electric power P is fixed. FIGS. 23-1 and 23-2 are conceptual diagrams illustrating a calculation error effect with respect to the line voltage.

As illustrated in FIGS. 21 and 22, the amount of supplied electric power (amount of heat) decreases as the inductance L increases; therefore, in the case of a Δ-connection (low impedance), the supplied electric power is large and thus the voltage command Vk for obtaining the same electric power is small compared to the case of a Y-connection (high impedance). Therefore, a large amount of electric power is supplied to the motor having a low impedance (high output) and thus it is necessary to operate with a lower voltage command when heating is performed with low electric power. In such a case, when the voltage command falls below Lim in FIG. 22, the pulse width of the line voltage is reduced as illustrated in FIG. 23-1, which is easily affected to a large degree by the calculating timing of a microcomputer (in which the inverter control unit 10 is installed) or the like that discretely performs a calculation. Therefore, the positive and negative output voltages become imbalanced, which leads to an increase in loss due to, for example, superimposition of DC currents due to the imbalance of the current flowing in the motor windings.

When the voltage command falls below Lim, the connection between the U-phase, V-phase, and W-phase of the inverter and the motor wirings is switched from a', b', and c' to a", b", and c" by the wiring switching unit 33a in FIG. 20 so that the wiring impedance is increased; therefore, the voltage command necessary for obtaining the same electric power can be increased as illustrated in FIG. 23-2. In other words, one ends of the wirings of the respective phases and the middle points of the wirings of the respective phases are connected to the wiring switching unit 33a, and the wiring switching unit 33a switches the connection between the one ends and the middle points of the respective phases. In the normal operation mode, the wiring switching unit 33a switches the connection to the one ends of the respective phases. In the heating operation mode, when the voltage command is equal to or larger than Lim, the wiring switching unit 33a switches the connection destination to the middle points of the respective phases. Furthermore, in the heating operation mode, when the voltage command falls below Lim, the inverter control unit 10 controls the wiring switching unit 33a such that the wiring switching unit 33a switches the connection to the one ends of the respective phases. Accordingly, it is possible to increase the voltage command necessary for obtaining the same electric power and thus to be relatively less susceptible to the effect of errors caused by a discrete calculation system of a microcomputer or the like. Thus, a low-cost microcomputer can be used, which can contribute to a reduction in cost. In a similar manner, in the case of switching between a Y-connection and a Δ-connection in the first embodiment, in the heating control mode, control may be performed such that a Y-connection is used when the voltage command falls below Lim.

In this embodiment, for each phase, connection points with the wiring switching unit 33a are two points, i.e., one end and the middle point; however, it is possible to provide three or more connection points and switch between three or more connection points, thereby enabling switching of the impedance to be performed more finely.

As described above, the heating method in the present embodiment is less susceptible to the effect of errors of a microcomputer or the like; therefore, the accuracy of the voltage output improves and the imbalance in the current is suppressed. Accordingly, the inverter loss can be reduced.

Moreover, according to the heating method in the present embodiment, a narrow-pulse current generated because of the recovery when the voltage command value is low can be suppressed and thus the inverter loss can be reduced.

Figure 24:
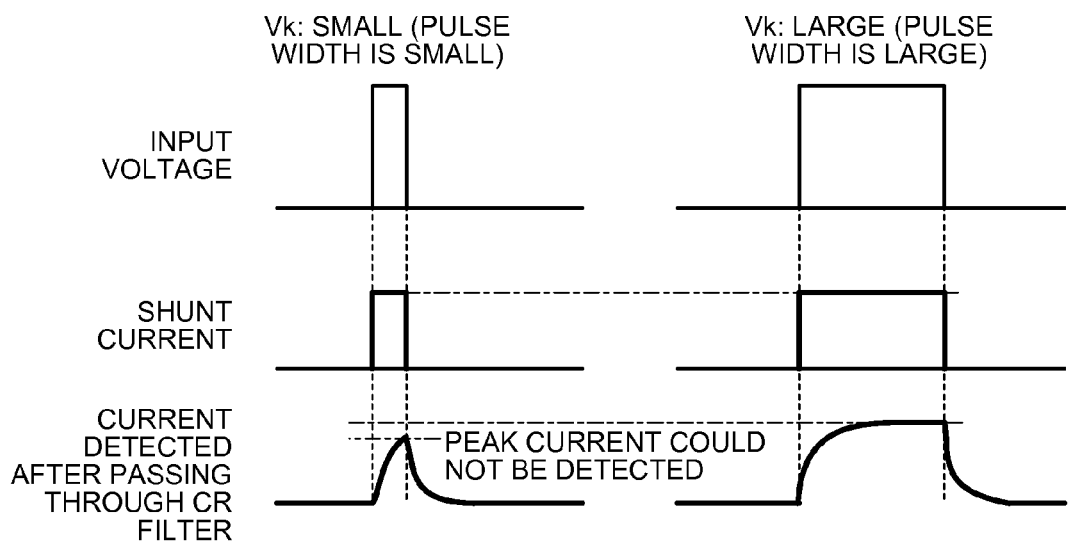
FIG. 24 is a diagram illustrating an example of a detected current when a CR filter is used.

Moreover, when a small amount of heat is supplied, the time during which a voltage is input to the protection circuit is reduced. Therefore, when, for example, a CR filter, which is an LPF (Low Pass Filter) composed of a resistor R and a capacitor C for removing noise, is used, the output waveform after passing through the CR filter is rounded and thus the voltage that should otherwise be detected cannot be detected in some cases. FIG. 24 is a diagram illustrating an example of a detected current when a CR filter is used. As illustrated in FIG. 24, when the output time of the voltage is short (the pulse width is narrow), the waveform is rounded and the voltage that should otherwise be detected cannot be detected; however, in the present embodiment, as illustrated on the right side in FIG. 24, the output time of the voltage can be increased. Therefore, the voltage can be definitely detected and thus the reliability can be improved.

Moreover, when a large amount of heat is supplied, heating is performed after the energization method is switched to the DC energization by the heating command unit; however, the current fluctuates largely with respect to the voltage in the motor having a low impedance and thus it is difficult to adjust the amount of heat because of the difficulty in controlling the current. Thus, the wiring resistance is increased by switching the motor wiring with the wiring switching unit 33a; therefore, the current fluctuations can be reduced. Accordingly, the controllability of the amount of heat is improved and the electric power necessary for heating can be accurately supplied. As a result, a liquid refrigerant can be definitely discharged and damage to the compressor can be prevented; therefore, the reliability can be improved.

In the present embodiment, the wiring-switching determining unit 34 causes the wiring switching unit 33a to perform switching in accordance with the operation mode; however, it is possible to determine whether to perform switching of the wirings on the basis of the information on at least one of the voltage command value, the current, the phase, and the like. For example, when it is determined that the current is small and the supplied electric power is small, control is performed such that the impedance becomes low in order to increase the flowing current. Therefore, the electric power necessary for discharging a liquid refrigerant can be definitely ensured and thus the reliability can be improved.

Moreover, because the design is such that the impedance can be changed by wiring switching according to the impedance of the motor 8, it is possible to adjust to the optimum impedance both in the normal operation mode and the heating operation mode. The number of taps of the wiring switching unit 33a in the present embodiment is two; however, the number of taps may be three or more or the configuration may be such that the impedance changes continuously. Therefore, it is possible to select the optimum impedance that is more in accordance with each state. The configuration of the wiring switching unit 33a is not limited to the configuration described in the present embodiment.

Third Embodiment

Figure 25:
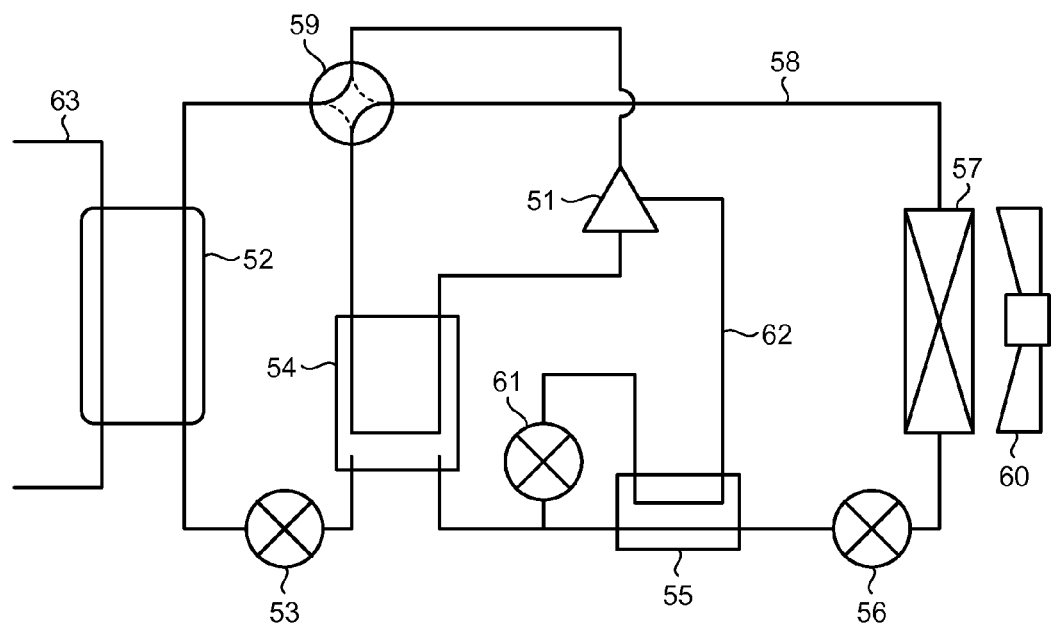
FIG. 25 is a diagram illustrating a configuration example of a heat pump device in a third embodiment.

FIG. 25 is a diagram illustrating a configuration example of a third embodiment of the heat pump device according to the present invention. In the present embodiment, an explanation will be given of an example of specific configurations and operations when the heat pump device explained in the first and second embodiments is mounted on an air conditioner, a heat pump water heater, a refrigerator, a freezer, and the like.

Figure 26:
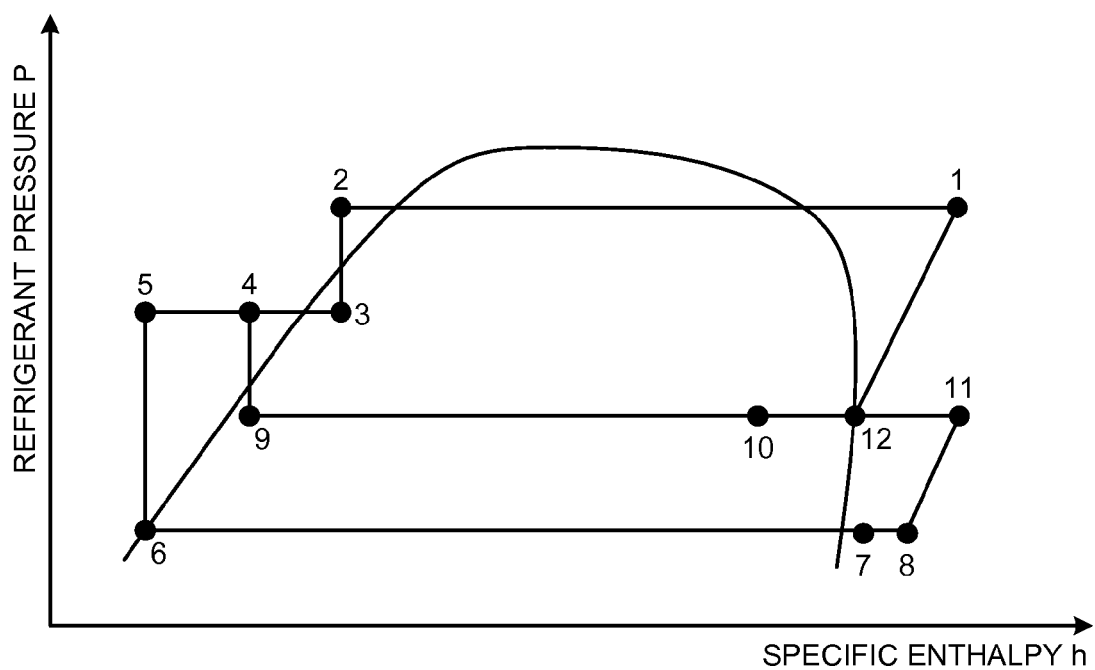
FIG. 26 is a Mollier chart of a state of a refrigerant of the heat pump device illustrated in FIG. 25.

FIG. 26 is a Mollier diagram of the state of the refrigerant of the heat pump device 100 illustrated in FIG. 25. In FIG. 26, the horizontal axis indicates the specific enthalpy and the vertical axis indicates the refrigerant pressure.

The heat pump device 100 in the present embodiment includes a main refrigerant circuit 58, in which a compressor 51, a heat exchanger 52, an expansion mechanism 53, a receiver 54, an internal heat exchanger 55, an expansion mechanism 56, and a heat exchanger 57 are sequentially connected by a pipe and through which a refrigerant circulates. In the main refrigerant circuit 58, a four-way valve 59 is provided on the discharge side of the compressor 51; therefore, the circulation direction of the refrigerant can be switched. A fan 60 is provided near the heat exchanger 57. The compressor 51 is the compressor 1 explained in the embodiments described above and is a compressor that includes the motor 8 driven by the inverter 9 and the compression mechanism 7.

Furthermore, the heat pump device 100 includes an injection circuit 62 that connects, by a pipe, from between the receiver 54 and the internal heat exchanger 55 to an injection pipe of the compressor 51. An expansion mechanism 61 and the internal heat exchanger 55 are sequentially connected to the injection circuit 62. A water circuit 63, in which water is circulated, is connected to the heat exchanger 52. A device that uses water, such as a hot water dispenser and a radiator, examples of which include a floor heating, is connected to the water circuit 63.

First, an explanation will be given of an operation of the heat pump device 100 in the present embodiment during the heating operation. In the heating operation, the four-way valve 59 is set in the direction of the solid line. The heating operation includes not only heating used for air conditioning but also hot-water supply for applying heat to water to make hot water.

The gas-phase refrigerant (at point 1 in FIG. 26) that has become a refrigerant having a high temperature and a high pressure in the compressor 51 is discharged from the compressor 51 and exchanges heat in the heat exchanger 52, which functions as a condenser and a radiator, to be liquefied (at point 2 in FIG. 26). At this point, water circulating in the water circuit 63 is heated by the heat radiated from the refrigerant and is used for heating and hot-water supply.

The liquid-phase refrigerant liquefied in the heat exchanger 52 is decompressed in the expansion mechanism 53 and enters a gas-liquid two-phase state (at point 3 in FIG. 26). The refrigerant that has entered a gas-liquid two-phase state in the expansion mechanism 53 exchanges heat with the refrigerant drawn into the compressor 51 by the receiver 54 so as to be cooled and liquefied (at point 4 in FIG. 26). The liquid-phase refrigerant liquefied in the receiver 54 is divided between the main refrigerant circuit 58 and the injection circuit 62 and flows therein.

The liquid-phase refrigerant flowing in the main refrigerant circuit 58 exchanges heat with the refrigerant flowing in the injection circuit 62, which is decompressed in the expansion mechanism 61 and has entered a gas-liquid two-phase state, in the internal heat exchanger 55 and is further cooled (at point 5 in FIG. 26). The liquid-phase refrigerant cooled in the internal heat exchanger 55 is decompressed in the expansion mechanism 56 and enters a gas-liquid two-phase state (at point 6 in FIG. 26). The refrigerant that has entered a gas-liquid two-phase state in the expansion mechanism 56 exchanges heat with the outside air in the heat exchanger 57, which functions as an evaporator, and is heated (at point 7 in FIG. 26). The refrigerant heated in the heat exchanger 57 is further heated in the receiver 54 (at point 8 in FIG. 26) and is drawn into the compressor 51.

On the other hand, as described above, the refrigerant flowing through the injection circuit 62 is decompressed in the expansion mechanism 61 (at point 9 in FIG. 26) and exchanges heat in the internal heat exchanger 55 (at point 10 in FIG. 26). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state.

In the compressor 51, the refrigerant drawn in from the main refrigerant circuit 58 (at point 8 in FIG. 26) is compressed to an intermediate pressure and heated (at point 11 in FIG. 26). The injection refrigerant (at point 10 in FIG. 26) joins the refrigerant compressed to the intermediate pressure and heated (at point 11 in FIG. 26), thereby decreasing the temperature (at point 12 in FIG. 26). The refrigerant having the decreased temperature (at point 12 in FIG. 26) is further compressed and heated to have a high temperature and a high pressure, and is discharged (at point 1 in FIG. 26).

When the injection operation is not performed, the aperture of the expansion mechanism 61 is fully closed. In other words, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51.

The aperture of the expansion mechanism 61 is electronically controlled by a control unit of a microcomputer or the like.

The operation of the heat pump device 100 during the cooling operation is explained next. In the cooling operation, the four-way valve 59 is set in the direction indicated by the broken line. The cooling operation includes not only cooling used for air conditioning but also drawing heat from water to make cold water, performing refrigeration, and the like.

The gas-phase refrigerant (at point 1 in FIG. 26) that has become a refrigerant having a high temperature and a high pressure in the compressor 51 is discharged from the compressor 51 and exchanges heat in the heat exchanger 57, which functions as a condenser and a radiator, to be liquefied (at point 2 in FIG. 26). The liquid-phase refrigerant liquefied in the heat exchanger 57 is decompressed in the expansion mechanism 56 and enters a gas-liquid two-phase state (at point 3 in FIG. 26). The refrigerant that has entered a gas-liquid two-phase state in the expansion mechanism 56 exchanges heat in the internal heat exchanger 55 so as to be cooled and liquefied (at point 4 in FIG. 26). In the internal heat exchanger 55, the refrigerant that has entered a gas-liquid two-phase state in the expansion mechanism 56 exchanges heat with the refrigerant (at point 9 in FIG. 26) that has entered a gas-liquid two-phase state by decompressing the liquid-phase refrigerant liquefied in the internal heat exchanger 55, in the expansion mechanism 61. The liquid-phase refrigerant (at point 4 in FIG. 26) exchanged heat in the internal heat exchanger 55 is divided between the main refrigerant circuit 58 and the injection circuit 62 and flows therein.

The liquid-phase refrigerant flowing in the main refrigerant circuit 58 then exchanges heat with the refrigerant drawn into the compressor 51 in the receiver 54 and is further cooled (at point 5 in FIG. 26). The liquid-phase refrigerant cooled in the receiver 54 is decompressed in the expansion mechanism 53 and enters a gas-liquid two-phase state (at point 6 in FIG. 26). The refrigerant that has entered a gas-liquid two-phase state in the expansion mechanism 53 exchanges heat in the heat exchanger 52, which functions as an evaporator, and is heated (at point 7 in FIG. 26). At this point, because the refrigerant absorbs heat, water circulating in the water circuit 63 is cooled and used for cooling and refrigeration. In this manner, the heat pump device 100 in the present embodiment configures a heat pump system together with a fluid utilization device that utilizes water (fluid) circulating in the water circuit 63, and this heat pump system can be used in an air conditioner, a heat pump water heater, a refrigerator, a freezer, and the like.

Then, the refrigerant heated in the heat exchanger 52 is further heated in the receiver 54 (at point 8 in FIG. 26) and drawn into the compressor 51.

On the other hand, as described above, the refrigerant flowing through the injection circuit 62 is decompressed in the expansion mechanism 61 (at point 9 in FIG. 26) and exchanges heat in the internal heat exchanger 55 (at point 10 in FIG. 26). The refrigerant (injection refrigerant) that has exchanged heat in the internal heat exchanger 55 and is in the gas-liquid two-phase state flows in from the injection pipe of the compressor 51 while remaining in the gas-liquid two-phase state. A compressing operation in the compressor 51 is the same as the compressing operation during the heating operation.

When the injection operation is not performed, as in the heating operation, the aperture of the expansion mechanism 61 is fully closed so as not to result in the refrigerant flowing into the injection pipe of the compressor 51.

In the above explanations, the heat exchanger 52 has been explained as a heat exchanger like a plate type heat exchanger that exchanges heat between the refrigerant and water circulating in the water circuit 63. The heat exchanger 52 is not limited thereto and may be other types of heat exchangers that exchange heat between a refrigerant and air. The water circuit 63 may not be a circuit in which water is circulated, but may be a circuit in which a fluid other than water is circulated.

As described above, the heat pump device 100 can be used for a heat pump device using an inverter compressor in an air conditioner, a heat pump water heater, a refrigerator, a freezer, and the like.

INDUSTRIAL APPLICABILITY

As explained above, the heat pump device according to the present invention is useful for an air conditioner, a heat pump water heater, a refrigerator, a freezer, and the like, and is particularly suitable for a heat pump device that heats the compressor by a high-frequency energization.

The invention claimed is:

1. A heat pump device comprising:
   a compressor that compresses a refrigerant;
   a motor that drives the compressor;
   a wiring switching unit that switches a wiring structure of the motor;
   an inverter that applies a desired voltage to the motor; and
   an inverter control unit that generates a PWM signal for driving the inverter, that includes, as an operation mode, a heating operation mode in which a heating operation is performed on the compressor and a normal operation mode in which a refrigerant is compressed by performing a normal operation on the compressor, and that controls a switching operation of the wiring switching unit, wherein
   in accordance with a connection state with the wiring switching unit, the motor forms either of a first wiring structure and a second wiring structure with which an impedance is smaller than that in the first wiring structure,
   in response to switching to the heating operation mode, the inverter control unit controls the wiring switching unit such that the motor forms the second wiring structure,
   after the motor forms the second wiring structure, the inverter control unit switches between a high-frequency energization in which a high-frequency AC voltage is applied to the wiring of the motor and a DC energization in which a DC current is applied to the wiring of the motor in accordance with a necessary amount of heat, and
   the inverter control unit switches, after the motor forms the second wiring structure, between the high-frequency energization to supply a first heating amount in the heating operation and the DC energization to supply a second heating amount greater than the first heating amount in the heating operation.

2. A heat pump device comprising:
   a compressor that compresses a refrigerant;
   a motor that drives the compressor;
   a wiring switching unit that switches a wiring structure of the motor;
   an inverter that applies a desired voltage to the motor; and
   an inverter control unit that generates a PWM signal for driving the inverter, that includes, as an operation mode, a heating operation mode in which a heating operation is performed on the compressor and a normal operation mode in which a refrigerant is compressed by performing a normal operation on the compressor, and that controls a switching operation of the wiring switching unit, wherein in accordance with a connection state with the wiring switching unit, the motor forms either of a first wiring structure and a second wiring structure with which an impedance is smaller than that in the first wiring structure, in response to switching to the heating operation mode, when at least one of an output voltage and a modulation degree is equal to less than a specified value, the inverter control unit controls the wiring switching unit such that the motor forms the first wiring structure, and after the motor forms the second wiring structure, the inverter control unit switches between a high-frequency energization in which a high-frequency AC voltage is applied to the wiring of the motor and a DC energization in which a DC current is applied to the wiring of the motor in accordance with a necessary amount of heat, and the inverter control unit switches, after the motor forms the second wiring structure, between the high-frequency energization to supply a first heating amount in the heating operation and the DC energization to supply a second heating amount greater than the first heating amount in the heating operation.

3. The heat pump device according to claim 1, wherein in the heating operation mode, the inverter control unit generates a PWM signal by comparing a voltage command value and a triangular carrier signal such that a high-frequency AC voltage having a frequency higher than an operation frequency in the normal operation mode is applied to two phases or three phases of the wiring of the motor, and controls the voltage command value such that voltage phases having phase differences of 0° and 180° with respect to a reference phase of a voltage to be applied to the motor are alternately switched, at a timing of a top and a bottom of a carrier signal.

4. The heat pump device according to claim 2, wherein in the heating operation mode, the inverter control unit generates a PWM signal by comparing a voltage command value and a triangular carrier signal such that a high-frequency AC voltage having a frequency higher than an operation frequency in the normal operation mode is applied to two phases or three phases of the wiring of the motor, and controls the voltage command value such that voltage phases having phase differences of 0° and 180° with respect to a reference phase of a voltage to be applied to the motor are alternately switched, at a timing of a top and a bottom of a carrier signal.

5. A heat pump device comprising:
a compressor that compresses a refrigerant;
a motor that drives the compressor;
a wiring switching unit that switches a wiring structure of the motor;
an inverter that applies a desired voltage to the motor; and
an inverter control unit that generates a PWM signal for driving the inverter and controls a switching operation of the wiring switching unit, wherein
in accordance with a connection state with the wiring switching unit, the motor forms either of a first wiring structure and a second wiring structure with which an impedance is smaller than that in the first wiring structure,
the motor is a three-phase motor,
one end of a wiring of each phase and a middle point of a wiring of each phase are connected to the wiring switching unit,
the wiring switching unit switches between the first wiring structure and the second wiring structure by switching a connection of the terminals,
in response to switching to the heating operation mode, the inverter control unit controls the wiring switching unit such that the motor forms the second wiring structure, and
after the motor forms the second wiring structure, the inverter control unit switches between a high-frequency energization in which a high-frequency AC voltage is applied to the wiring of the motor and a DC energization in which a DC current is applied to the wiring of the motor in accordance with a necessary amount of heat, and
the inverter control unit switches, after the motor forms the second wiring structure, between the high-frequency energization to supply a first heating amount in the heating operation and the DC energization to supply a second heating amount greater than the first heating amount in the heating operation.

6. The heat pump device according to claim 1, wherein the motor is a three-phase motor,
both terminals of a wiring of each phase of the motor are connected to the wiring switching unit, and
the wiring switching unit switches between a Y-connection that is the first wiring structure and a Δ-connection that is the second wiring structure by switching a connection of the terminals.

7. The heat pump device according to claim 2, wherein the motor is a three-phase motor,
both terminals of a wiring of each phase of the motor are connected to the wiring switching unit, and
the wiring switching unit switches between a Y-connection that is the first wiring structure and a Δ-connection that is the second wiring structure by switching a connection of the terminals.

8. The heat pump device according to claim 1, wherein a switching element and a diode that constitute the inverter is formed from a wide gap semiconductor, and the wide gap semiconductor is any of silicon carbide, a gallium nitride material, and diamond.

9. The heat pump device according to claim 2, wherein a switching element and a diode that constitute the inverter is formed from a wide gap semiconductor, and the wide gap semiconductor is any of silicon carbide, a gallium nitride material, and diamond.

10. The heat pump device according to claim 5, wherein a switching element and a diode that constitute the inverter is formed from a wide gap semiconductor, and the wide gap semiconductor is any of silicon carbide, a gallium nitride material, and diamond.

11. The heat pump device according to claim 1, wherein a switching element that constitutes the inverter is a MOSFET having a super junction structure.

12. The heat pump device according to claim 2, wherein a switching element that constitutes the inverter is a MOSFET having a super junction structure.

13. The heat pump device according to claim 5, wherein a switching element that constitutes the inverter is a MOSFET having a super junction structure.

14. An air conditioner comprising the heat pump device according to claim 1.

15. An air conditioner comprising the heat pump device according to claim 2.

16. An air conditioner comprising the heat pump device according to claim 5.

\* \* \* \* \*